United States Patent [19]
Jenkin et al.

[11] Patent Number: 6,088,351
[45] Date of Patent: Jul. 11, 2000

[54] METHOD AND APPARATUS FOR ACCOMMODATING SIGNAL BLOCKAGE IN SATELLITE MOBILE RADIO SYSTEMS

[75] Inventors: Keith R. Jenkin, San Marco; Terrence R. Smigla, Manhattan Beach, both of Calif.

[73] Assignee: TRW Inc., Redondo Beach, Calif.

[21] Appl. No.: 08/872,752

[22] Filed: Jun. 11, 1997

Related U.S. Application Data

[63] Continuation-in-part of application No. 08/665,143, Jun. 14, 1996, Pat. No. 5,867,530.

[51] Int. Cl.[7] .................................................. H04J 13/00
[52] U.S. Cl. ................................................................ 370/347
[58] Field of Search .................................. 370/347, 330, 370/310, 319, 329, 281, 311, 312, 314, 316, 320, 321, 332–337, 341–345, 441, 442, 503, 535, 537, 465; 342/352, 373; 455/13.3, 20, 428, 25, 427, 12.1, 63, 67.3, 69, 103; 375/296; 348/7, 12, 13; 379/219

[56] References Cited

U.S. PATENT DOCUMENTS

| | | | |
|---|---|---|---|
| 5,594,941 | 1/1997 | Dent | 370/310 |
| 5,848,060 | 12/1998 | Dent | 370/319 |

*Primary Examiner*—Dang Ton
*Attorney, Agent, or Firm*—Michael S. Yatsko

[57] ABSTRACT

A digital audio radio system where multiple digital data versions of a single source signal are transmitted to one or more satellites to be rebroadcast to a defined reception area where the multiple versions are delayed with respect to each other. One of the signals is intended to be used by a mobile receiver if the transmission from the satellite is not blocked, and the other one or more versions are intended to be used if the broadcast signal from the satellites is blocked. Because the multiple versions represent the same source signal that is received at different times, if the signal from satellites is blocked, the signal being received at a different time can be used. The signals that are to be used when the broadcast signal is blocked can be of a lesser data quality to conserve system resources.

58 Claims, 20 Drawing Sheets

Dedicated Logic Example (Block Diagram)

METHOD AND APPARATUS FOR ACCOMMODATING SIGNAL BLOCKAGE IN SATELLITE MOBILE RADIO SYSTEMS

CROSS REFERENCE TO RELATED APPLICATIONS

This application is a continuation-in-part application of U.S. patent application Ser. No. 08/665,143, filed Jun. 14, 1996 now U.S. Pat No. 5,867,530.

BACKGROUND OF THE INVENTION

1. Field of the Invention

The present invention generally relates to a system for accommodating radio signal blockage, and in particular to a system for accommodating signal blockage in satellite mobile radio systems.

2. Discussion of the Related Art

With the increasing utilization of satellites for commercial data communication, radio broadcasting via satellite communication is becoming feasible. Radio channels are beamed from earth ground stations to orbiting satellites, which in turn beam the radio channels to individual users all over the earth.

In existing satellite radio systems, a broadcast studio generates analog audio signals much the same as a conventional radio station studio does. For example, an announcer provides real-time narration, and then typically plays music selections from a library of CD music albums. The analog signals are converted to a digital stream of samples, called PCM ("Pulse code modulation"). The conversion is performed for real-time voice or live music performances by passing the analog signals to an A/D ("analog-to-digital converter"). The digital output consists of 16 bit linearly quantized waveform amplitude samples for two channels (stereo right and left), at a sampling rate of approximately 44 kilosamples per second ("ksps"). This is the data stream quality of CD music in temporal sampling resolution and amplitude resolution. In the case of playing music CDS, the A/D step is not necessary since the audio data is already in a digital format on the CD.

The digital audio data is then passed to a satellite ground station for transmission to a satellite on its radio frequency "uplink" carrier. The data can be compressed to save bandwidth and other system resources. The satellite receives the signal from the ground station and retransmits it to the area on the earth's surface where radio reception is desired. For example, the satellite can have a "downlink" beam pattern that covers the continental United States.

The user's receiver (e.g., a car radio) decompresses the digital data, and converts it back to analog signals (one for each stereo channel) with a DAC ("digital-to-analog converter") for subsequent amplification and listening through loudspeakers.

If a user is on a mobile platform, such as a moving automobile, then unique problems are encountered. There are many sources of line-of-sight obscuration as one drives along a typical road or highway. Foliage (trees) attenuates a downlink signal from the satellite, and can even render it unusable if the foliage is particularly dense. Furthermore, there are many sources of truly opaque blockage to the signal, such as telephone poles, billboards, buildings, bridge overpasses, and adjacent large vehicles.

The obstructions can be divided into two groups: (1) Attenuating: Those objects, such as trees or other foliage, which partially reduce signal strength, and (2) Opaque: Those objects which effectively cut off the line-of-sight signal from the satellite completely, such as telephone poles, buildings, overpasses, or even other adjacent vehicles. In the first case, there are several classical means of assuring adequate signal for acceptable reception. These include extra signal strength (called "link margin") broadcast from the satellite to "burn through" moderate foliage coverage, schemes such as interleaving redundant digital bits so that occasional single bit errors have imperceptible effect, and error-detection/correction "coding." As long as there is adequate single (i.e., signal-to-noise ratio), and adequate error correction, radio performance is unaffected.

In the case of totally opaque objects other means have been proposed for accommodation. One is to employ two identical satellites, broadcasting the same radio program material. The satellites are positioned in their orbits such that the angle from each satellite to the user's radio is substantially different. Thus, the changes of both signals being obscured at the same time are unlikely, and radio operation continues without interruption. Another approach is to use two antennas mounted on the car, one fore (on the hood), and one aft (on the trunk lid). Smaller obstructions are thus accommodated, since at least one antenna is in view of a satellite as the vehicle travels along.

However, frequently, the signal from both satellites is lost. During such times, there is total signal loss "blockage" and there is no radio reception. As such, satellite radio use in automobiles is limited to the most barren of terrain, such as the open desert, because the continual and annoying dropout of a radio program is unacceptable to users. Further, use of two satellite systems is costly.

There is, therefore, a need for a satellite radio communication system which enables widespread use and acceptance of satellite radio. There is also a need for such a system to remedy signal loss due to occasional opaque blockages encountered while moving, allowing continuous, uninterrupted radio operation.

SUMMARY OF THE INVENTION

In accordance with the teachings of the present invention, a digital audio radio system is disclosed in which multiple versions of a digital data source signal are transmitted to one or more satellites to be rebroadcast to a defined reception area, where the multiple versions are delayed relative to each other. One of the versions is intended to be used by a mobile receiver if the broadcast signal from the satellite is not blocked, and the other one or more versions are intended to be used if the broadcast signal from the satellites is blocked. Because each of the multiple versions represent the same source signal that is received at different times, if the signal from the satellites is blocked, the signal being received at a different time can be used. The versions that are to be used when the broadcast signal is blocked can be of a lesser data quality to conserve system resources and the versions can include complimentary and mutual information to be combined for a complete signal.

The various versions of the source signal can be separated using any technique in which multiple time-separated versions of the same source signal can be simultaneously transmitted and independently received and separated by a receiver. For example, a time multiplexing technique, a frequency domain multiplexing technique, a code division multiplexing scheme, or different electromagnetic polarizations can be employed. Additionally, the receiver may also be designed to perform a weighted combining of the multiple received signals for greater performance. Interleaving techniques can be used to further increase system integrity, and multiple source signals can be transmitted using any applicable channelization technique.

BRIEF DESCRIPTION OF THE DRAWINGS

These and other features, aspects and advantages of the present invention will become understood with reference to the following description, appended claims and accompanying drawings where:

DETAILED DESCRIPTION OF THE PREFERRED EMBODIMENTS

Figure 1:
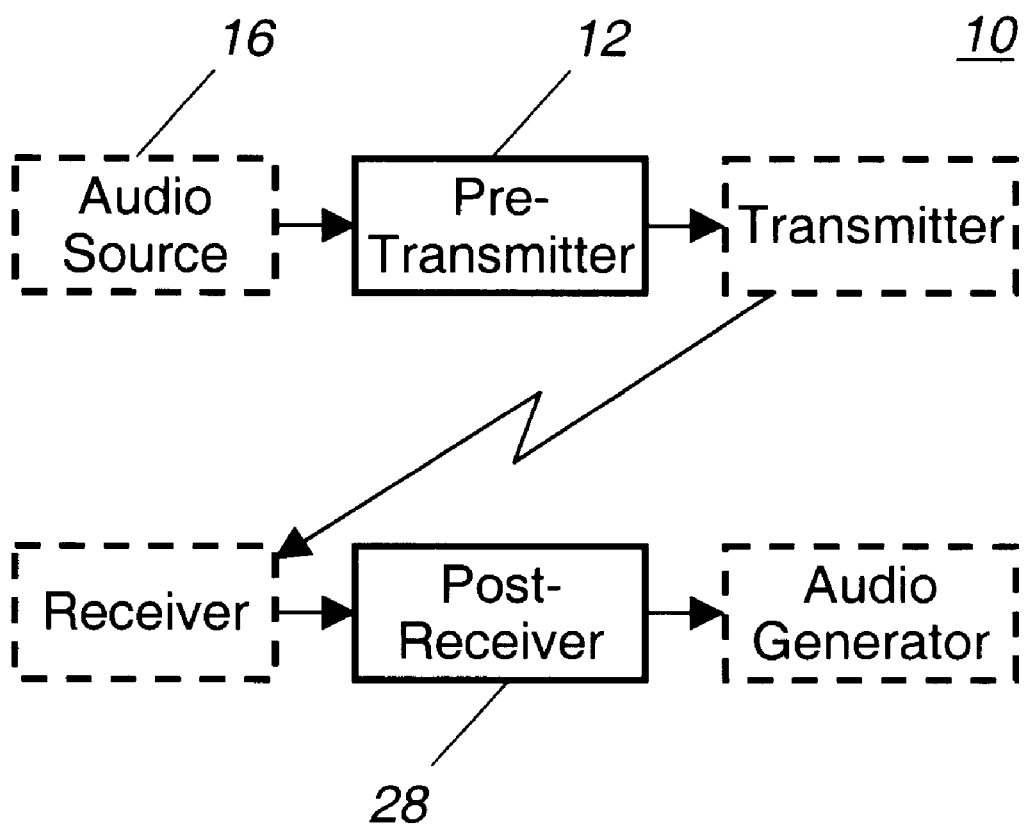
FIG. 1 illustrates a block diagram of an embodiment of a communication system according to the present invention.
Figure 2:
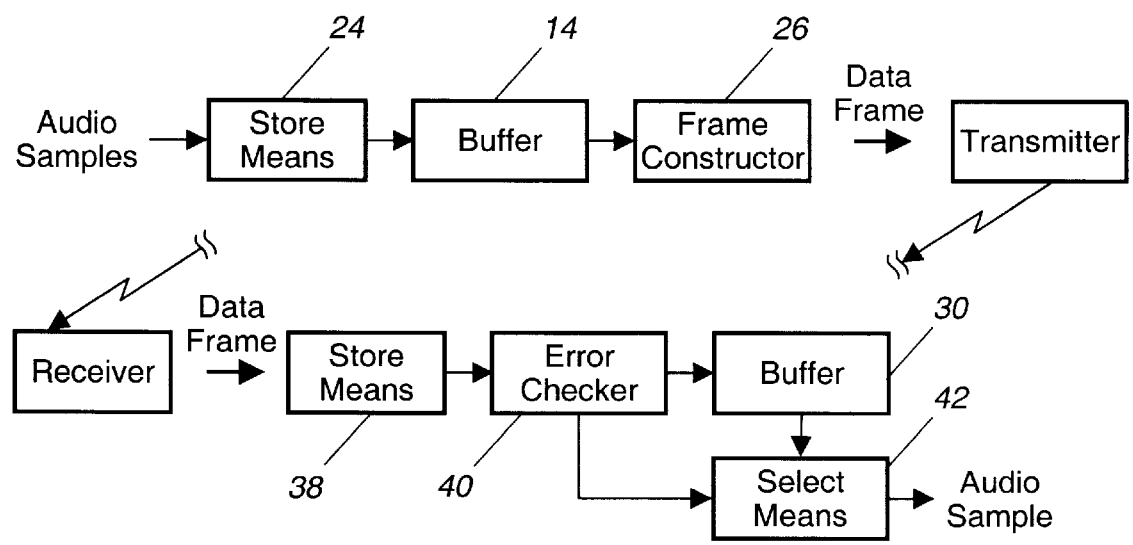
FIG. 2 is a detailed block diagram of embodiments of the pre-transmitter and post-receiver systems of FIG. 1.
Figure 3:
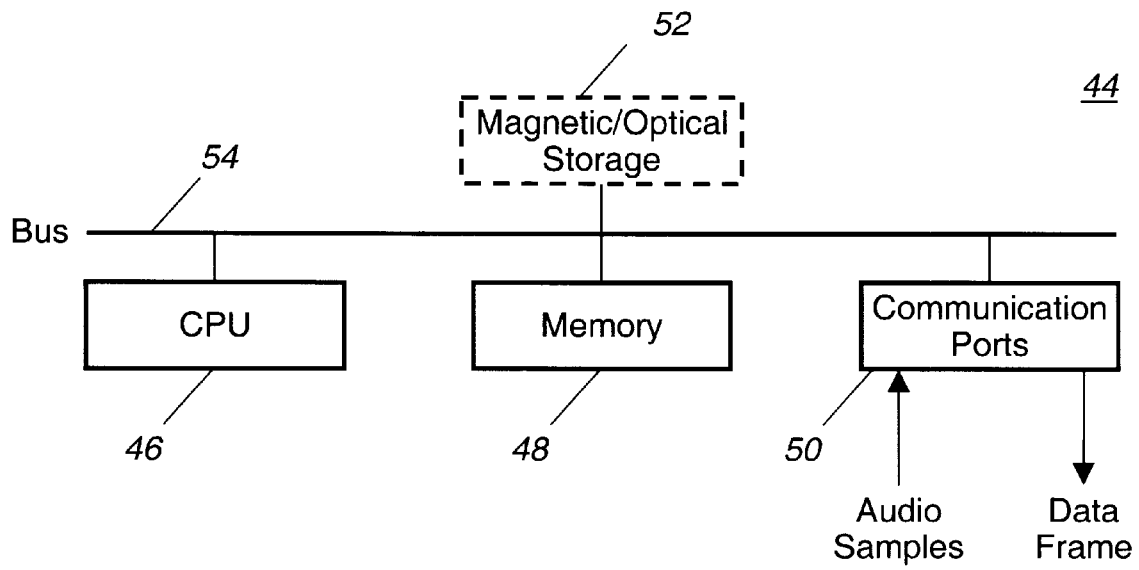
FIG. 3 illustrates the architecture of the pretransmitter of FIG. 2.
Figure 4:
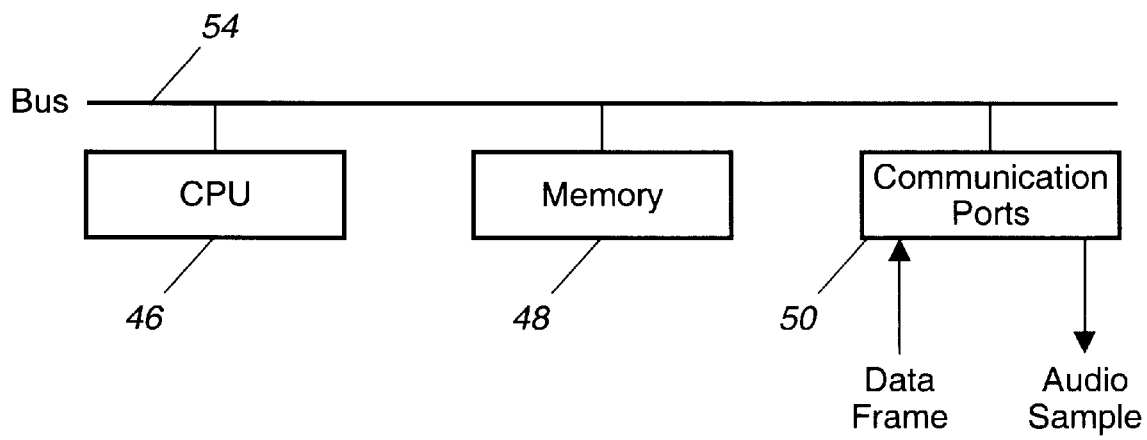
FIG. 4 illustrates the architecture of the post-receiver system of FIG. 2.
Figure 5:
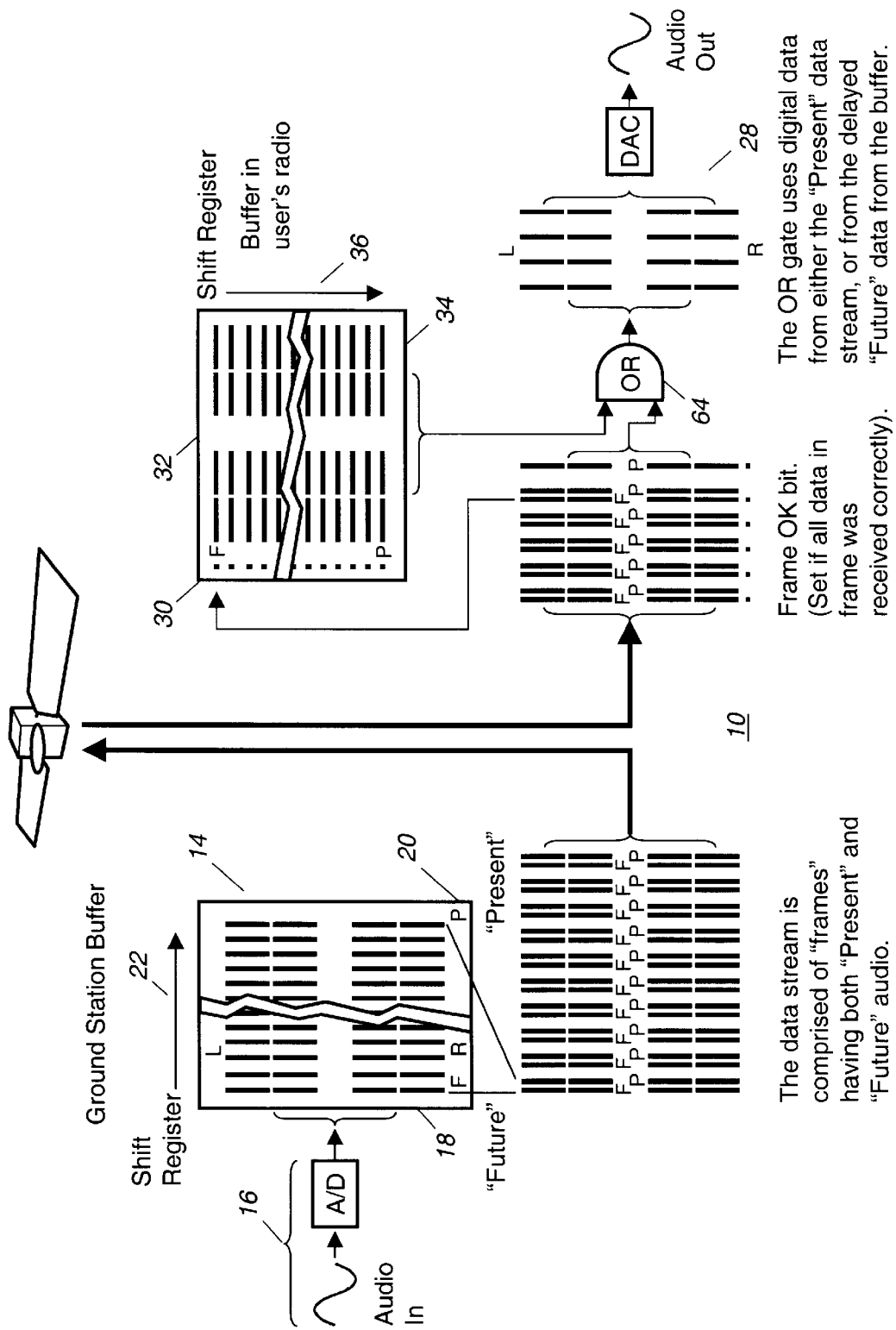
FIG. 5 is an overall block diagram.

Referring to FIGS. 1–5, an embodiment of a communication system 10 for providing uninterrupted radio operation according to the present invention is shown. The system 10 comprises a pre-transmitter system 12 including: (i) a first buffer 14 for storing a sequence of digital audio samples from an audio source 16, the first buffer 14 having a beginning 18, an end 20 and a length 22; (ii) storing means 24 for storing the audio samples in the first buffer 14 in shift register configuration format; and (iii) frame construction means 26 for constructing a data frame including a first audio sample from the end 20 of the first buffer 14 and a second audio sample from the beginning 18 of the first buffer 14. The data frame can be transmitted and received by a receiver.

The communication system 10 further comprises a post-receiver system 28 including: (i) a second buffer 30 having a beginning 32, an end 34 and a length 36 identical to the length 22 of the first buffer 14; (ii) storing means 38 for storing the second audio sample in the received data frame in the second buffer 30 in shift register configuration format; (iii) means 40 for determining if the data frame was properly received; and (iv) selection means 42 for selecting an audio sample for audio output, wherein the first audio sample in the data frame is selected if the data frame was properly received, otherwise, an audio sample from the end 34 of the second buffer 30 is selected. If neither sample is "good," then a null sample (e.g., all bits set to 9) is injected into the data stream, and no audio will be produced (an unavoidable dropout occurs). Alternatively, instead of a null sample, the last or previous sample can be injected into the data stream when only a few data samples are corrupt. Other alternatives include an interpolation scheme, or a gentle ramp up/down to null (0) when a stream of samples is missing to avoid a transient "pop" sound in audio output.

The pre-transmitter system 12 can be implemented utilizing a general purpose computer system programmed with instructions for performing the steps of the method of the present invention described below. Typically, a general purpose computer system 44 includes a central processing unit (CPU) 46, memory 48, communication ports 50 and optionally, magnetic or optical storage 52 interconnected through a bus 54. The first buffer 14 can be implemented as a ring buffer using address pointers in memory. The storing means 24 for storing audio samples into the first buffer 14 can be a set of program instructions providing buffer operations including insertion, deletion and shifting. Audio samples arrive at the communication port 50 of the computer system 44 and are inserted into the first buffer 14 by the storage means 24 via the bus 54.

The frame construction means 26 for constructing a data frame can be a set of program instructions for copying data samples from the end 20 and the beginning 18 of the first buffer 14. The data frame can be stored in a segment of the memory 48 for output through the communication port 50 via the bus 54. An example embodiment of a set of pseudo program instructions for implementing the means for storage and the means for constructing a frame of data is discussed in Example I below.

The pre-transmitter system 12 can also be implemented utilizing a dedicated logic system. In such a system the first buffer 14 can be a memory shift register clocked at a desired rate for receiving audio samples and providing audio samples for transmission at that clock rate. The first buffer 14 can also be implemented with pointers and conventional memory if preferred. Example II below describes an example embodiment of a dedicated logic system.

The post-receiver system 28 can be implemented utilizing a general purpose computer system 44, described above, programmed with instructions for performing the steps of the method of the present invention described below. The second buffer 30 can be implemented as a ring buffer using address pointers in memory. The storing means 38 for storing audio samples into the second buffer 30 can be a set of program instructions providing buffer operations including insertion, deletion and shifting. Data frames arrive at the communication port 50 of the computer system 44, and the second audio sample in each data frame is inserted into the second buffer 30 by the storage means 40 via the bus 54.

The means 40 for determining whether a data frame has been properly received can be implemented by assigning a "Frame OK bit" to each Frame. By examining either the analog signal strength received or error-detection information embedded in the digital data (e.g., parity, checksum, CRC, etc.) or some combination of these, the post-receiver can establish the fidelity of data in a Frame. If no errors are detected, the Frame is assigned a "good" flag in its "OK bit," and if not, the bit is set to "bad." This "OK" bit is carried along with the samples through subsequent processing. An example embodiment of a set of pseudo program instructions for implementing the storing means 38, the means 40 for determining and the means 42 for selecting is discussed in Example I below.

The post-receiver system 28 can also be implemented utilizing discrete logic elements or chips, a gate array, or by using an embedded microprocessor CPU and ROM microcode. The second buffer 30 can be a memory shift register clocked at a desired rate for receiving audio samples and providing audio samples for transmission at that clock rate. The second buffer 30 can also be implemented with pointers and conventional memory if preferred. Example II below describes an example embodiment of a dedicated logic system.

FIGS. 6–12 illustrate an example embodiment of the operational steps of the system 10 of FIGS. 1–4 for a sequence of transmission events from a transmitting ground station via a satellite to a receiving ground station. An audio source generates digital samples (e.g., two 16 bit channels, or 4 bytes per sample) which are received by the pre-transmitter system 12 and fed into the first buffer 14. As each new sample arrives, all of the samples in the buffer 14 are shifted along simultaneously, in shift register configuration format. The buffer 14 has an input 56 where new samples are inserted into the buffer, and an output 58 where samples are shifted out of the buffer. As such, the beginning 18 of the buffer 14 is at the input 56, and the end 20 of the buffer 14 is at the output 58. The length 22 of the buffer 14 determines the maximum number of digital samples that can be stored in the buffer 14 at any time.

After an initial startup period, the buffer 14 is always full, and continues to migrate samples from its input 56 ("Future" sample) to its output 58 ("Present" sample). "Present" and "Future" are relative times referred to by a user radio as described below. The length 22 of the buffer 14 and the shift clock rate determine the time delay between "Present" and "Future" samples. This delay period amount can be determined for a specific embodiment such that performance is optimal for the desired operating scenarios.

At each clock cycle (sample period), a "frame" of data is constructed for transmission via a transmission medium such as a satellite. The data frame consists of both a "Future" ("F") sample, and a "Present" ("P") sample (one delayed in time by the buffer). Thus, a stream of data is transmitted via an uplink consisting of pairs of samples, one "Future," one "Present," at every sample period. In this embodiment the effective data volume (bit rate) for transmission has doubled. The satellite then retransmits the data stream via a downlink to a receiver, such as a user radio, in which the stream of sample pairs (Present and Future) is reconstructed from the data frames by the post-receiver system 28 according to the present invention.

At the post-receiver system 28, a "Frame OK bit" is assigned to each data frame to indicate whether the data frame has been properly received. This can be implemented by examining either the analog signal strength received or error-detection information embedded in the digital data (e.g., parity, checksum, CRC, etc.) or a combination. Thus, the post-receiver system 28 can establish the fidelity of data in a data frame. If no errors are detected, the data frame is assigned a "good" flag in its "OK bit," and if not, the bit is set to "bad." The "OK" bit is carried along with the samples through subsequent processing.

The second buffer 30 has an input 60, corresponding to the beginning 32 of the buffer 30, and an output 62 corresponding to the end 34 of the buffer 30. At the post-receiver system, the Future samples are split off and injected into the input 60 of the second buffer 30. The length 36 of the buffer 30 (delay time) matches that of the first buffer 14 in the pre-transmitter system 12. As time progresses, samples migrate through the second buffer 30, until at the output 60 of the buffer 30 they are identical to the Present samples from the incoming data stream. The "OK" bits are preserved along with the samples as they flow through the buffer 30.

In this embodiment, the selection means 42 includes an "OR" switch 64, utilized to select a data sample from the incoming real-time Present data samples or from the second buffer 30 for audio generation. Selection depends on the "OK" bits of the data samples. IF the real-time sample "OK bit" is "good," then the real-time Present sample is selected. If not, the delayed Present sample is selected (assuming its OK bit is "good"). If neither sample is "good," then a null sample (e.g., all bits set to 0) is injected into the data stream, and no audio will be produced (an unavoidable dropout occurs). Alternatively, instead of a null sample, the last or previous sample can be injected into the data stream when only a few data samples are corrupt. Other alternatives include an interpolation scheme, or a gentle ramp up/down to null (0) when a stream of samples is missing to avoid a transient "pop" sound in audio output.

Figure 6:
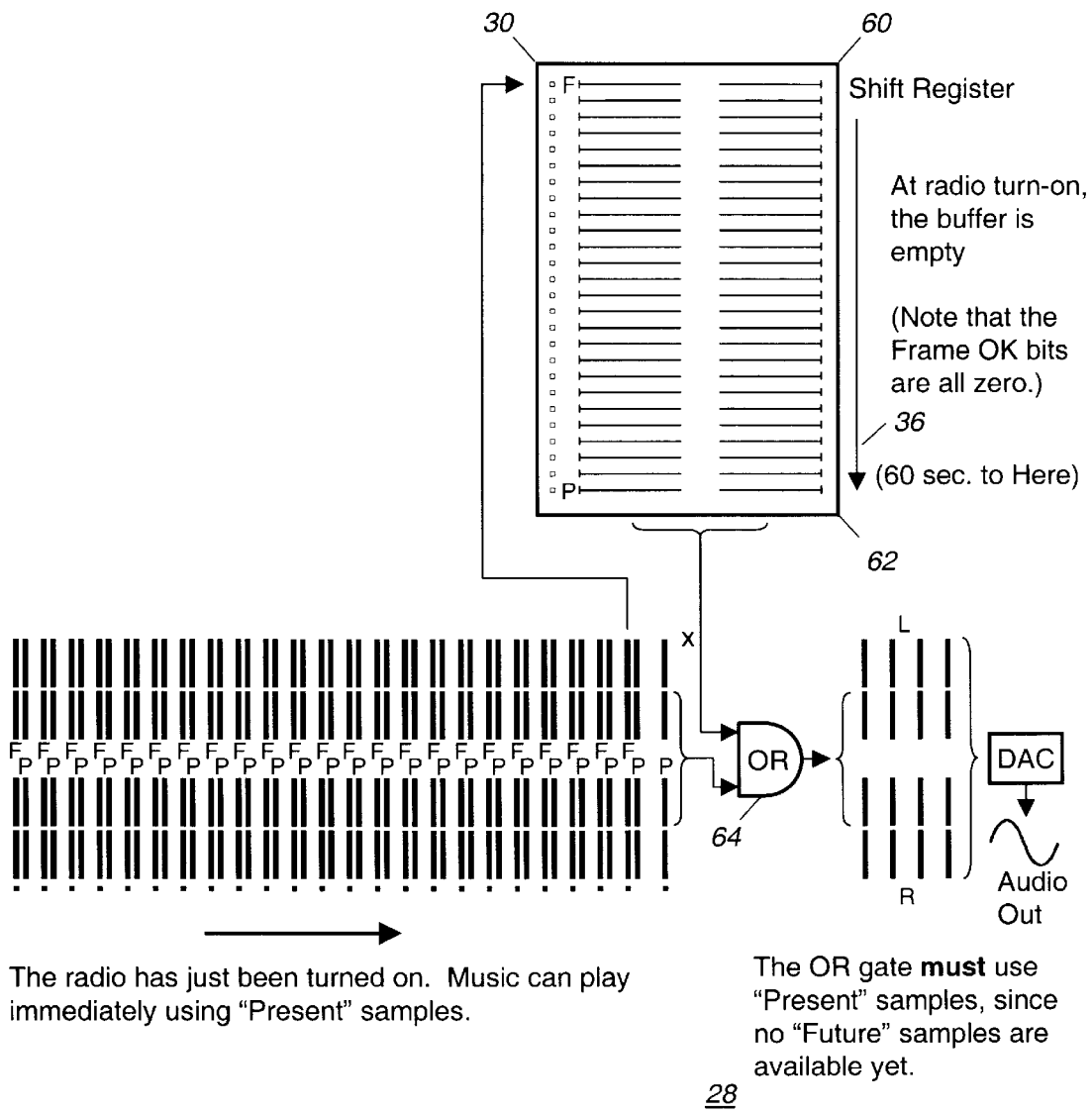
FIGS. 6–12 illustrate the operational steps of the system of FIG. 1 for a sequence of transmission events.

FIG. 6 provides a more detailed view of the post-receiver system 28 operation. Initially, when a radio containing the post-receiver system 28 is first turned on, the buffer 30 is empty and all of the OK bits in the buffer 38 are initialized to 0. Thus, only the real-time incoming Present samples are available as valid samples to the OR switch 64. As such, advantageously, there is no delay in radio operation (audio output) when it is first turned on. This is in contrast to bit interleaving schemes which must wait until all memory is filled before audio output can begin. For the embodiment discussed here, a buffer length (time delay) of 60 seconds is assumed.

Figure 7:
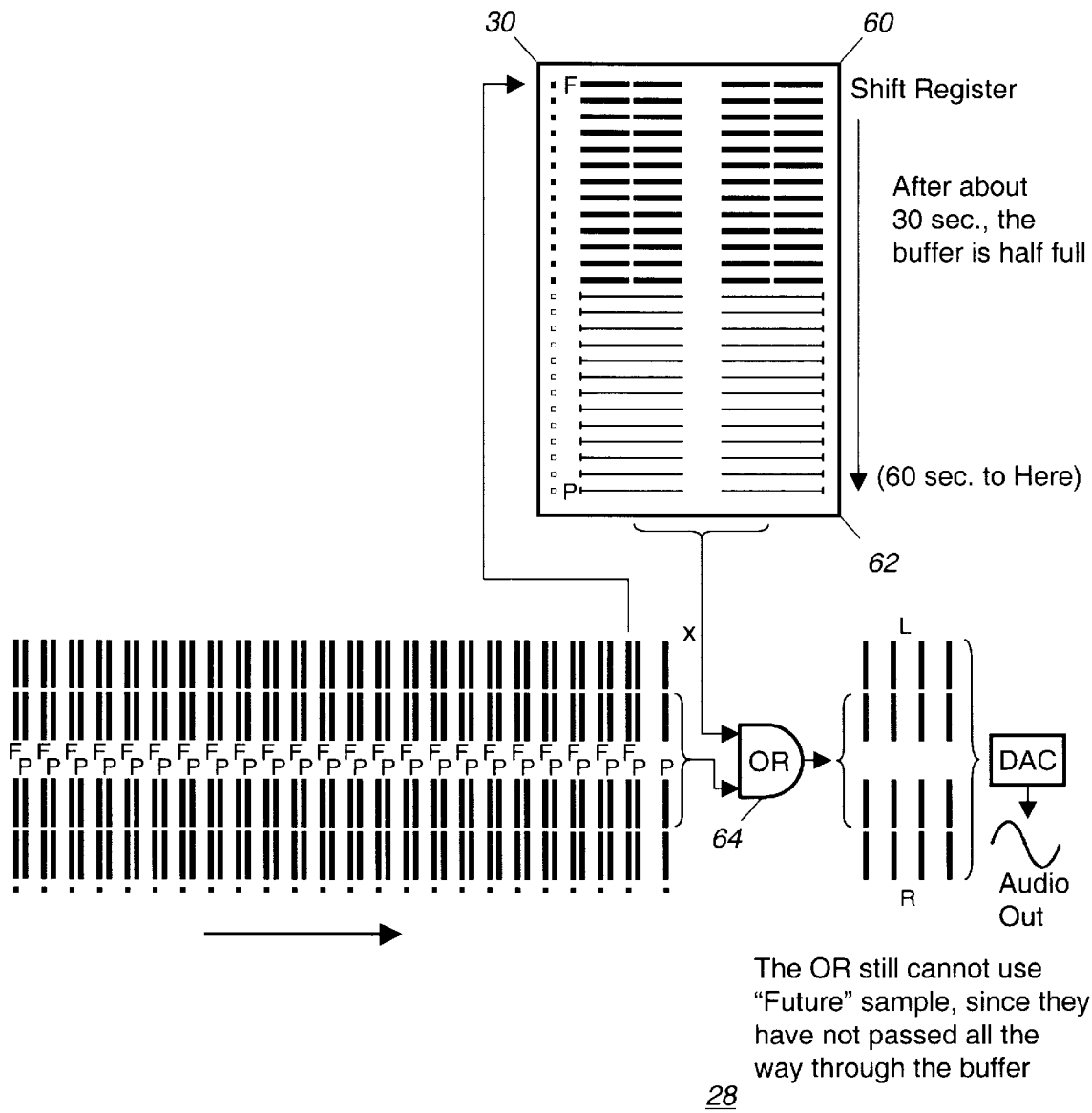

FIG. 7 illustrates the status of the post-receiver system 28 a short time after it has been turned on (e.g., 30 seconds). The buffer 30 has begun to fill up with good "Future" samples, and the samples have migrated about halfway through their passage in the buffer 30. The OR switch 64 still has only "Present" samples available as valid data.

Figure 8:
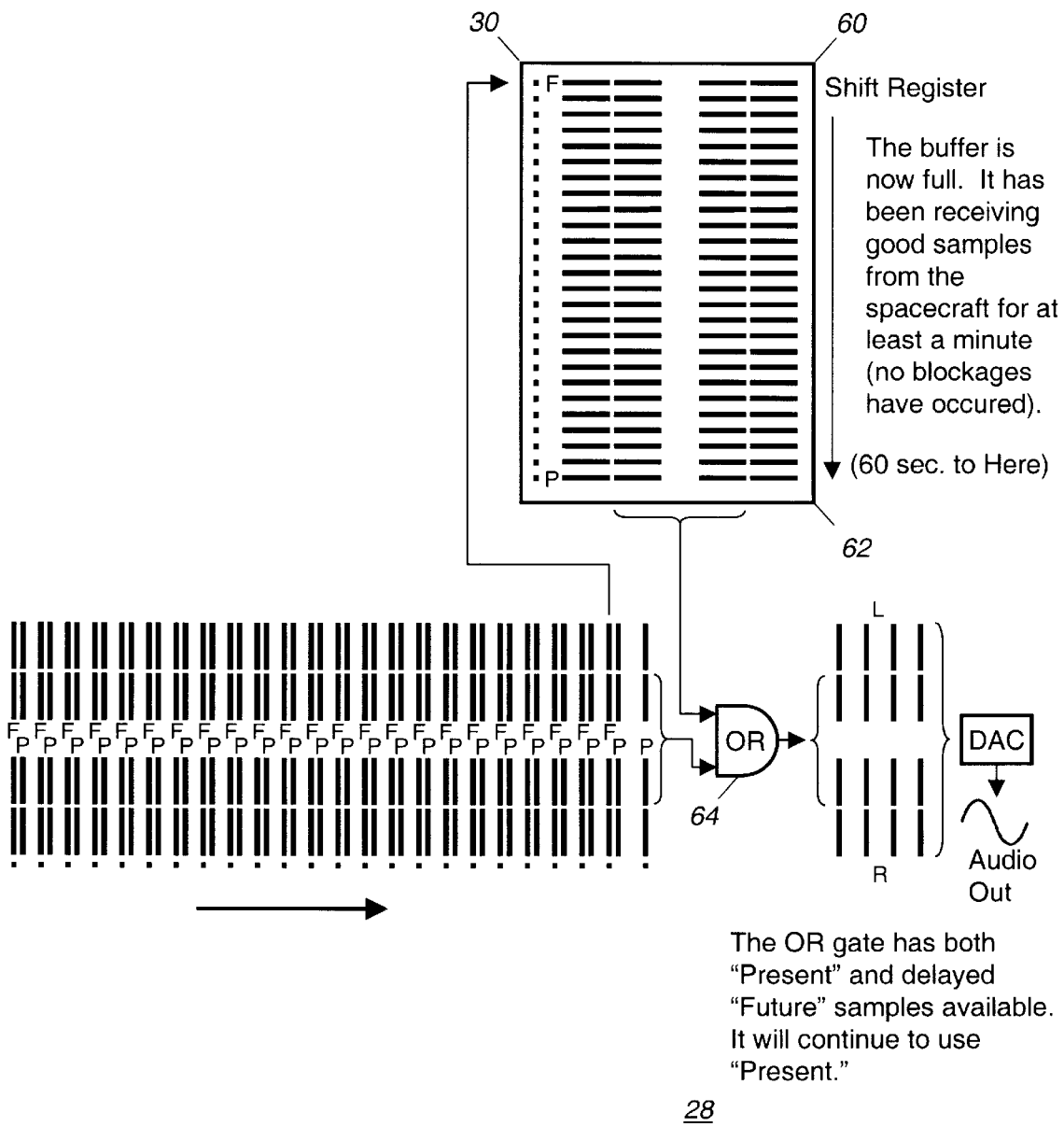

FIG. 8 illustrates the status of the post-receiver system 28 after an initial 60 seconds after radio turn-on and continual reception of a good signal. The buffer 30 is now full with valid samples, and is able to provide the OR switch 64 with valid delayed "Present" samples.

Figure 9:
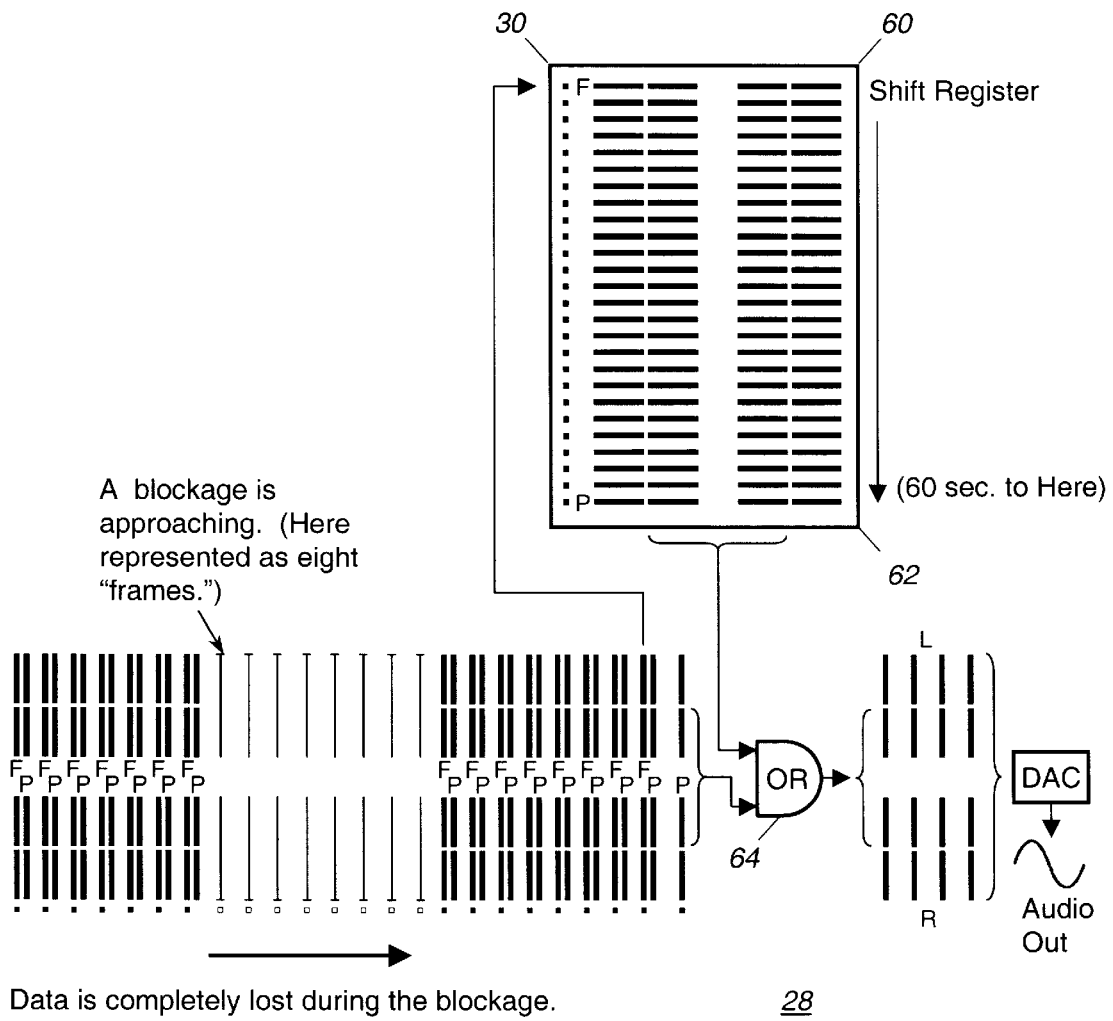

FIG. 9 illustrates a blockage encountered by the post-receiver system 28, causing a section of lost samples in the incoming data stream from the satellite.

Figure 10:
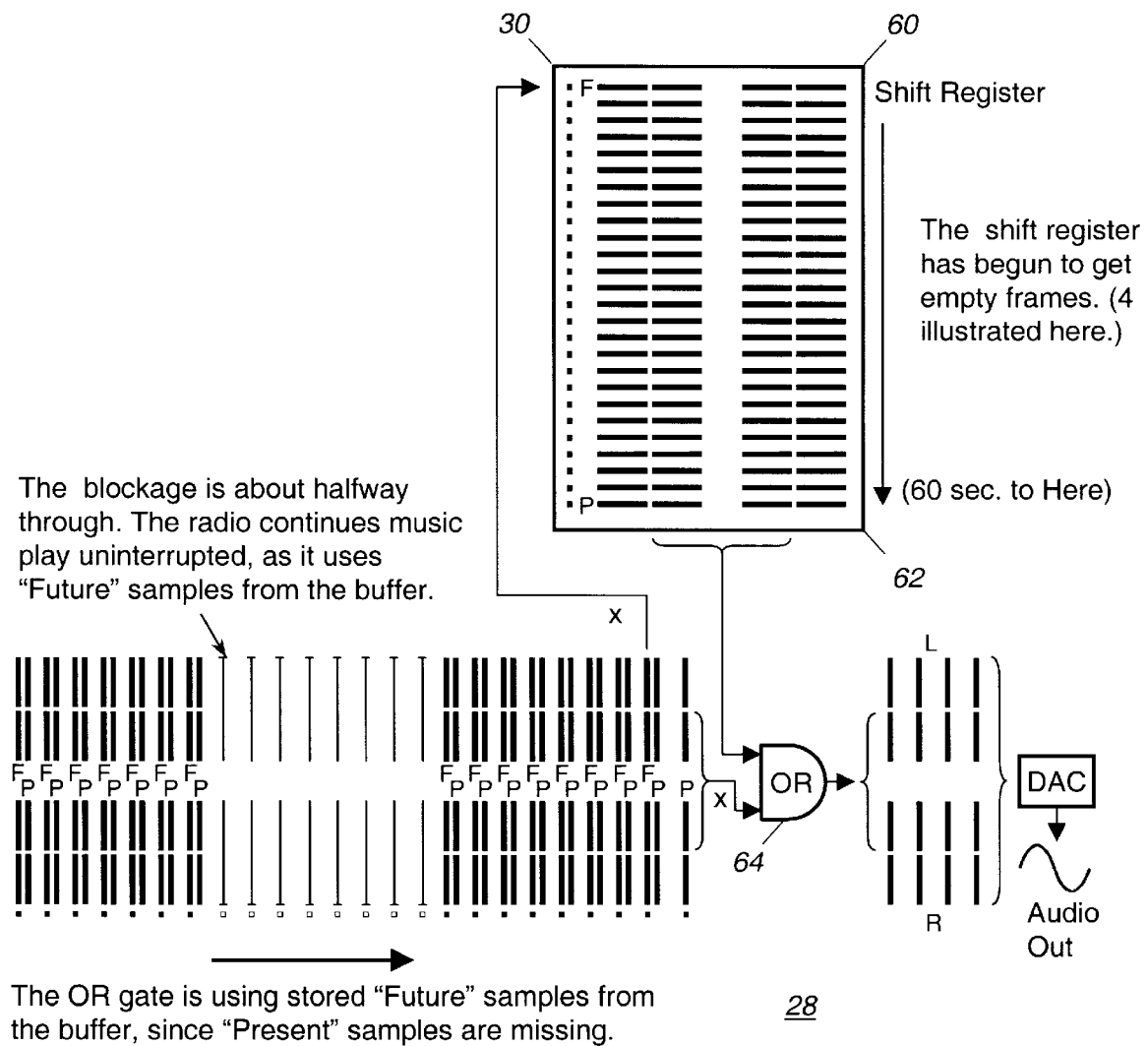

FIG. 10 shows the blockage about halfway through its travel in the system 28. The real-time Present samples are invalid. The paired Future samples are also invalid as they are inserted into the input 60 of the buffer 30. However, advantageously, the OR switch 64 has good delayed-Present samples available from the output 62 of the buffer 30, and the radio continues producing audio even though the incoming signal has been completely blocked for an extended period. The example buffer length discussed for this example embodiment can produce audio for blockages for as long as a full minute, as might be encountered at a stoplight or while driving through a tunnel.

Figure 11:
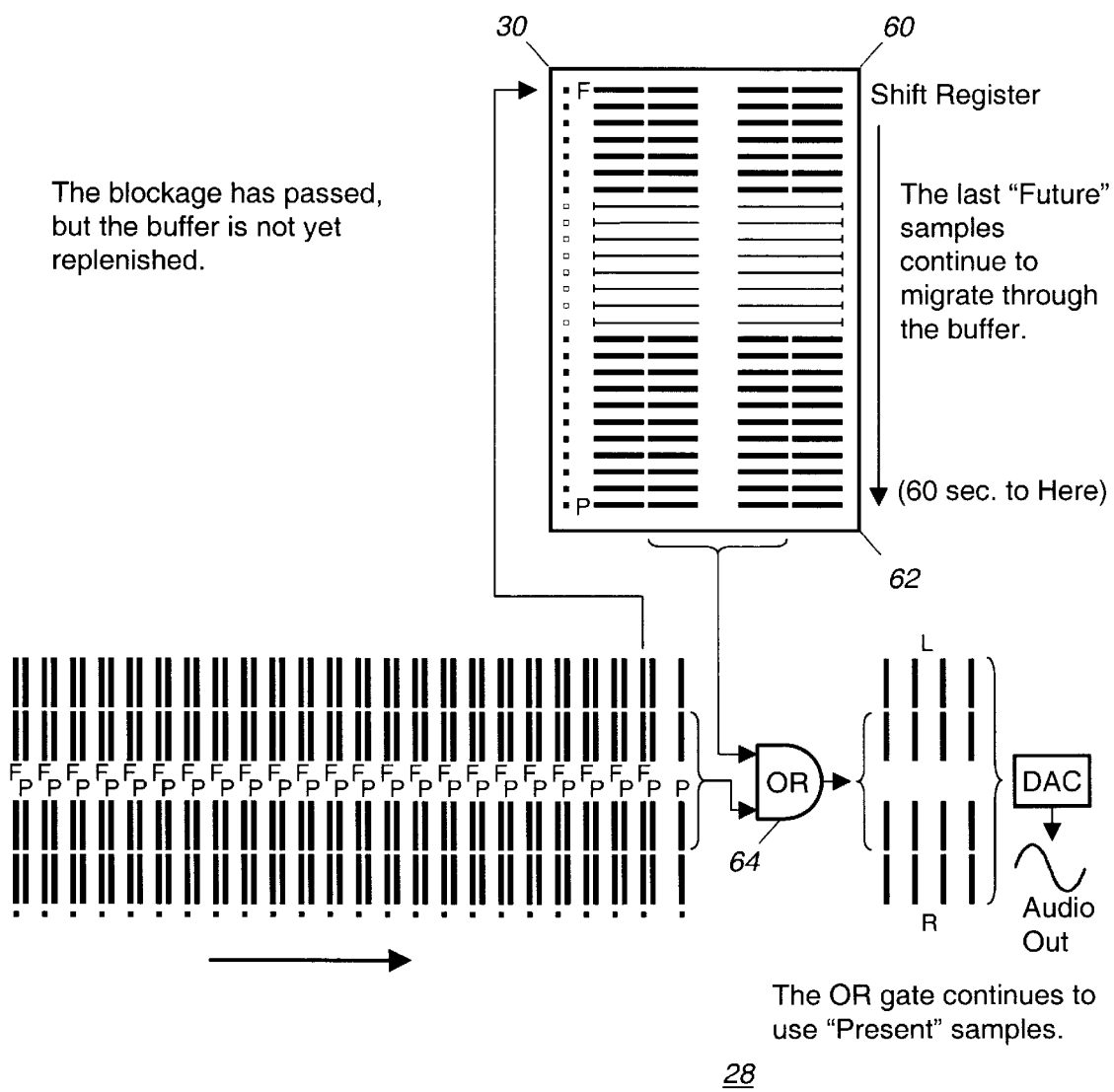

FIG. 11 shows the blockage after it has passed, and good samples are again being received. The bad Future samples resulting from the blockage have passed about midway through the buffer 30. Radio audio is still being produced, since the OR switch 64 has good Present samples available from real-time reception.

Figure 12:
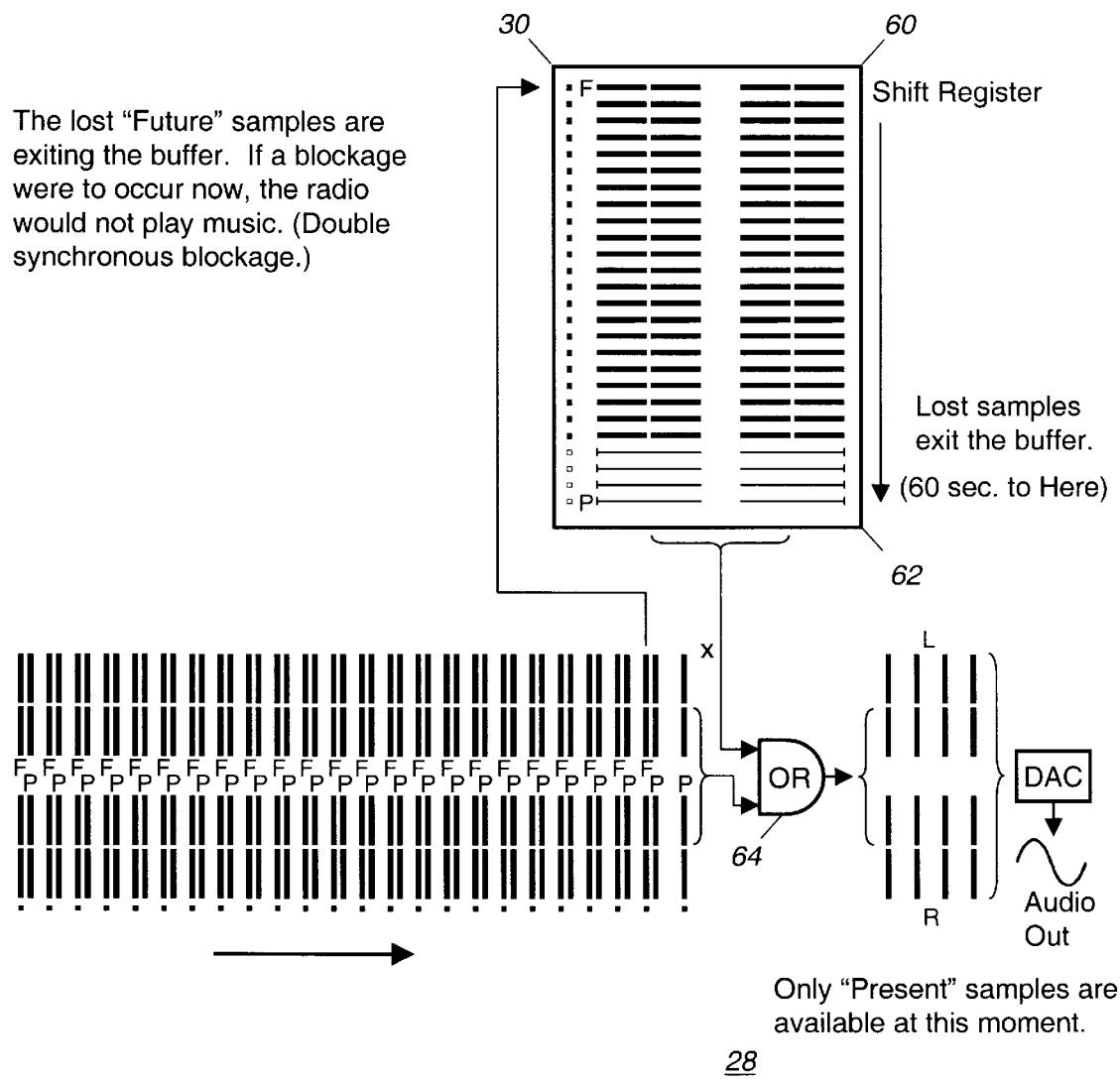

FIG. 12 shows the status of the post-receiver system 28 as the blockage samples in the buffer 30 exit the buffer 30 about a minute after the blockage occurred.

Figure 13:
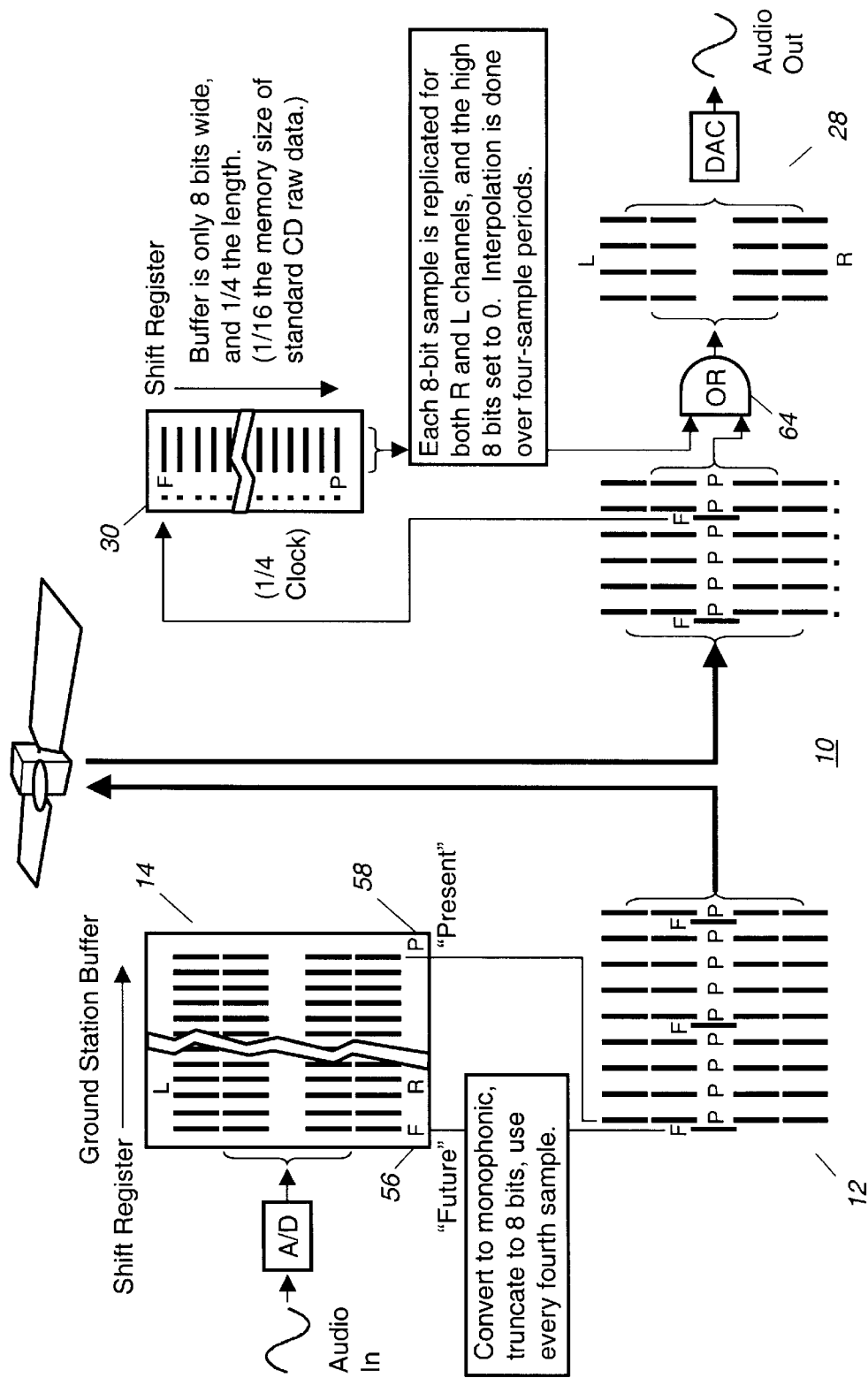
FIG. 13 illustrates another embodiment of a communication system according to the present invention.

FIG. 13 illustrates an example implementation of another embodiment of the communication system 10 of the present invention. To reduce the size of the buffer 30 of the post-receiver system 28 and to reduce the communication link bit rate, the example embodiment shown in FIG. 11 incorporates the following three features by affecting the format of the "Future" samples transmitted: (1) Transmitting only monophonic audio to reduce the bit rate (and buffer storage size) by a factor of two; (2) Reducing the amplitude resolution of the Future samples from the nominal 16 bit resolution, with 8 bit amplitude resolution as a practical lower limit (a factor of two less in bit rate and storage), and 12 bit resolution as an intermediate choice (¾ the amount of transmitted data); and (3) Reducing the sampling period of Future samples by a factor of two (22 ksps) or 4 (11 ksps). Other values for the aforementioned reductions are possible and can be selected according to desired requirements.

In the system of FIG. 13, the Future samples are monophonic, 8 bits in amplitude resolution, and at an 11 ksps sampling rate (¼ of the nominal 44 ksps rate). The Future samples from the buffer 14 of the pre-transmitter system 12 are converted to monophonic (add the stereo signals, and divide by two), truncated to 8 bits (drop the high order, least significant byte), and reduced to one sample per every four of the nominal 44 ksps sample rate. The latter could be implemented by, for example, trapping the maxima/minima within alternating four sample sections. The resulting single byte is combined with the transmitted nominal 16 bit, 44 ksps stereo bit stream. The effective increase in bit rate is about 6% ($^{17}/_{16}$ bytes per Frame). As a result, advantageously, the user radio memory requirement is drastically reduced, by a factor of 16.

If the Future sample data is used by the OR switch 64 of the post-receiver system 28 during a blockage period, the delayed-Present data from the buffer 30 is converted to emulate the standard 16 bit, stereo 44 ksps audio data stream. The 8 bit data (byte) is used for both the right and left stereo channel, and a null (all 0) least significant byte is added to make 16 bit samples. The same samples could be replicated four times to get 44 ksps from the 11 ksps, or an "oversampling" algorithm, such as interpolation, could be applied for more sophistication.

The present invention also contemplates utilizing digital audio compression to reduce the length 36 of buffer 30 for a given time delay. For example, with a compression ratio of 12:1, maintaining essentially "CD quality" sound, the buffer memory requirement is reduced to about one megabyte in size. In the above example embodiments, the 60 second delay selected between Present and Future is arbitrary, and can be longer or shorter as desired in an actual specific design, as determined by the maximum blockage period to be accommodated.

Figure 14:
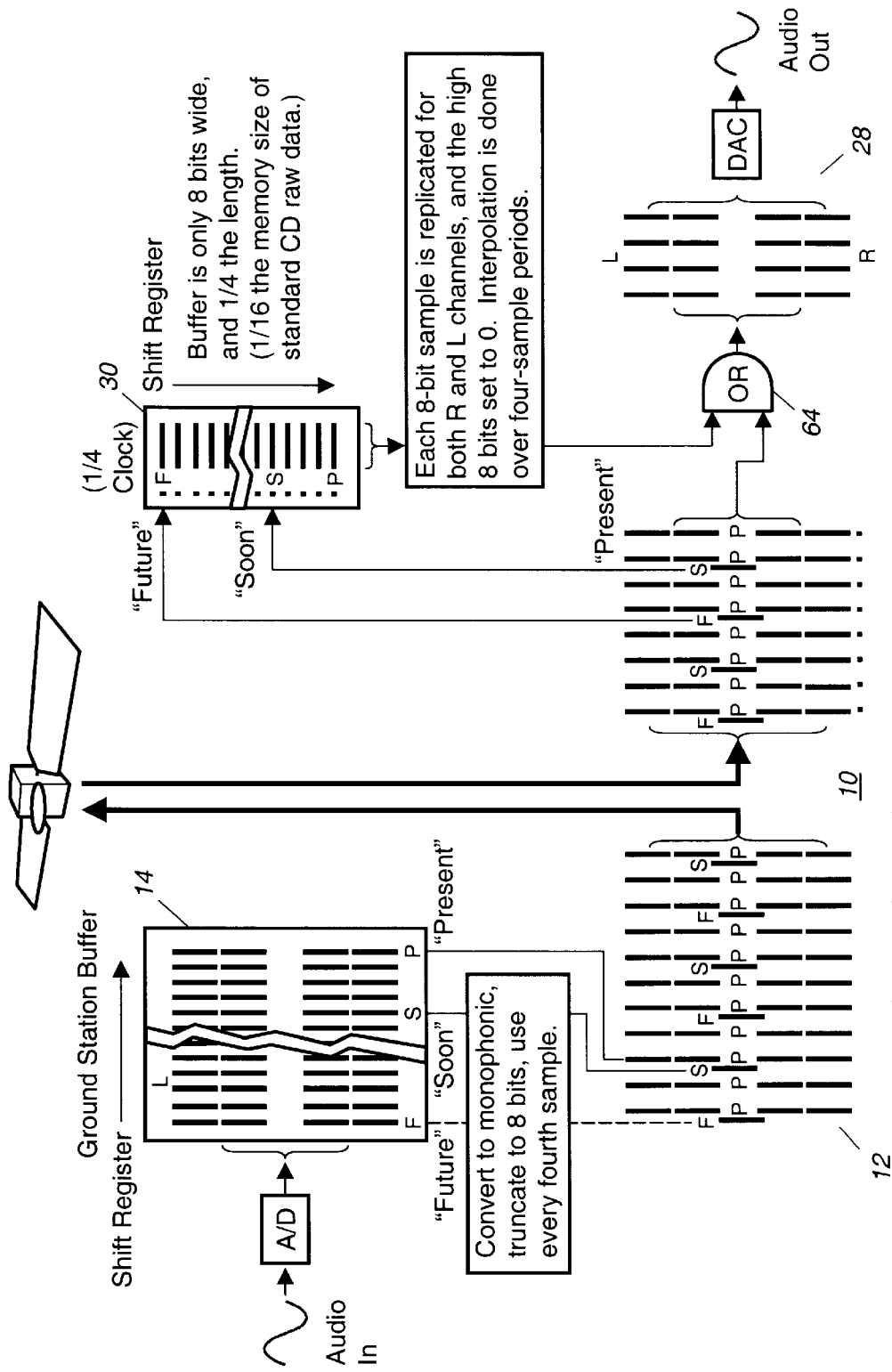
FIG. 14 illustrates another embodiment of a communication system according to the present invention.

FIG. 14 illustrates yet another embodiment of the present invention. In addition to the "Future" samples transmitted by pre-transmitter system 12, both the pre-transmitter and post-receiver buffers 14 and 30, respectively, are tapped at a shorter delay period, labeled "Soon." In the pre-transmitter 12, both the Future and Soon samples are included with Present samples to construct a data frame for transmission. With a monophonic 8 bit 11 ksps rate, the Soon samples (along with the Future samples) would increase the transmitted bit rate by only about 12.5 percent (approximately about 6% for Future and about 6% for Soon).

In the post-receiver system 28, both Future and Soon samples are stripped from the data stream frame, and the Future samples sent to the buffer input 60 as described above. The Soon samples are inserted into the buffer 30 at a point in the buffer corresponding to the delay of Soon samples in the pre-transmitter 12. The Soon sample can be inserted anywhere between Future and Present, such as close to Future, or in the middle of Present and Future. The insertion point depends on the specific nature of the blockage scenario a particular design is aimed at mitigating.

The Future and Soon samples are checked for validity and their OK bits set accordingly. If the Soon sample is invalid it is not sent to the buffer 30. If the present Sample is invalid, a delayed-Future sample during a blockage is used by the OR switch 64. In the system of FIG. 14, when short blockages occur, followed by short periods of good data, the buffer 30 is replenished rapidly below the Soon insertion point. Furthermore, if repetitive short blockages such as a row of telephone poles are encountered which are approximately synchronous with the total buffer delay, the Soon injections will prevent audio loss.

The system of FIG. 14 is advantageous for circumstances where both long and frequent short duration blockages are encountered. Objects such as telephone poles, street signs, and traffic lights produce relatively short but opaque blockages (fractions of a second). Overpasses, buildings, and passing traffic (large trucks) would typically result in relatively long blockages (several seconds). The system of FIG. 14 remedies the situation where repetitive blockages such as telephone poles are encountered which have a separation period approximating the nominal delay of the pre-transmitter and post-receiver buffers 14 and 30, respectively. Even though the blockages are short, audio loss can occur since blockages are synchronous with the lengths 22 and 36 of the buffers 14 and 30, respectively. This is because a new blockage is encountered just as the previous blockage exits the buffer 30 of the post-receiver 28, resulting in audio loss. The present invention also contemplates use of more than one tap spread optimally throughout the buffers 14 and 30.

Figure 15:
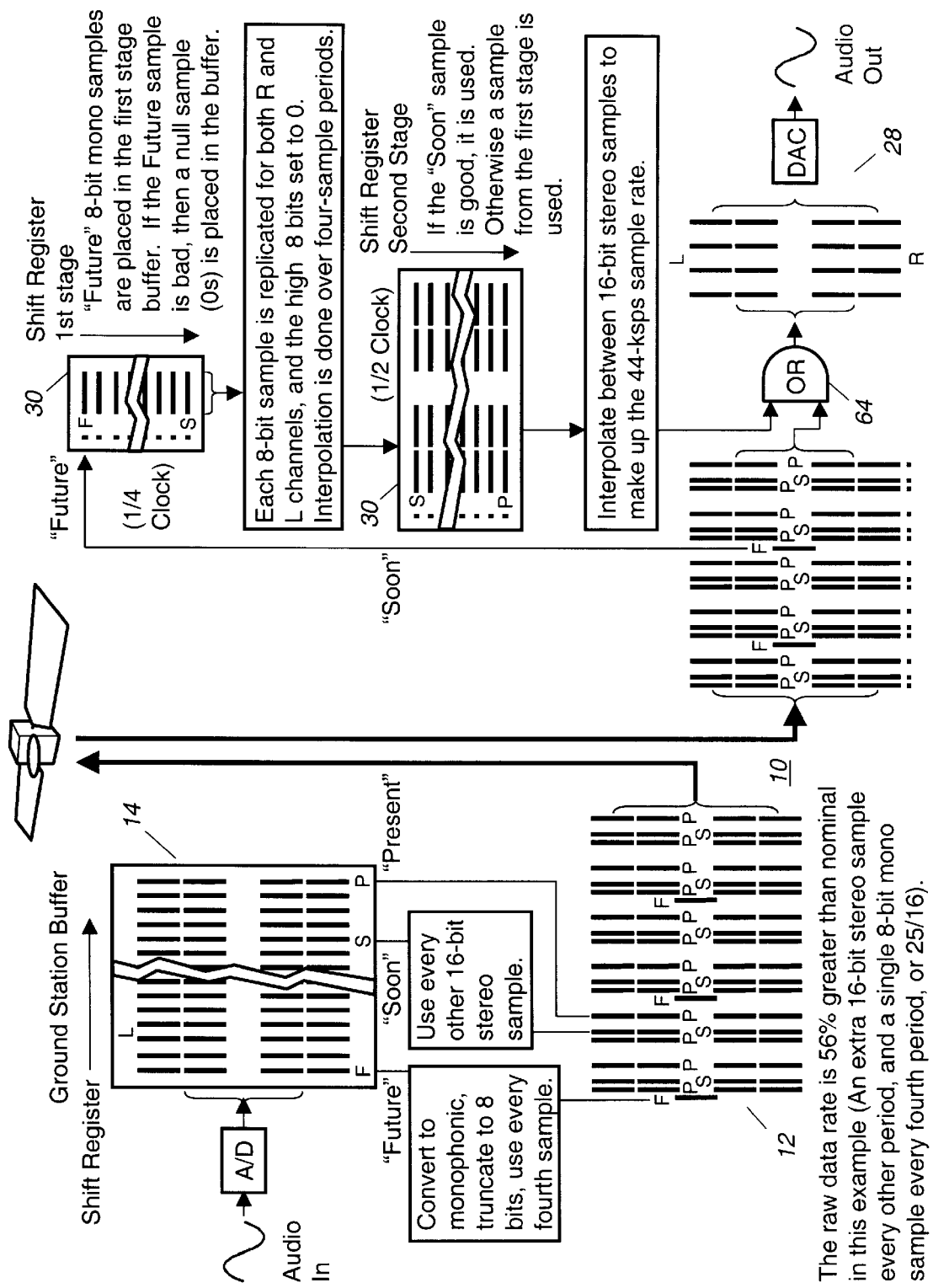
FIG. 15 illustrates yet another embodiment of a communication system according to the present invention.

FIG. 15 illustrates yet another embodiment of the present invention. The system of FIG. 15 is a hybrid design, where the Future samples are reduced in size (e.g., 8 bit monophonic at 11 ksps), but the Soon samples maintain nearly the same audio quality as the original data (e.g., CD 16 bit stereo samples at 22 ksps). As such, the system of FIG. 15 can be optimized for cost versus performance: short blockages would be unnoticed by the listener, while long blockages would have reduced audio quality but maintain operation.

The post-receiver buffer 30 is split into two stages: The first stage handles the long duration blockages with the 8 bit monophonic Future samples, while the second stage handles the higher quality Soon samples.

In a transmission scenario where two or more satellites are employed to provide angular line-of-sight diversity, then, according to the present invention, the signal from the first satellite represents the Present samples, and the signal from the second satellite represents the Future data samples, and the signal from any additional satellites would have additional delay times, such as the Soon delay described. Note that if two or more satellites are used for Present and Future (or more taps of delay), there is no increase in communications link bit rate as there is with a single satellite and Present and Future (and Soon) combined in the same signal. The advantages of this invention can therefore be combined with systems utilizing two (or more) satellites without link rate impact (only the shift register buffer memory and associated logic is needed). By adding this invention to a two-satellite system, the nominal spatial diversity advantage of two satellites is significantly enhanced for obviously coincident (and not just random) blockage situations, such as a bridge overpass (both satellites are definitely blocked). This aspect of the invention can also be utilized in transmission systems using low or medium altitude satellite constellations which require many satellites for global continuous coverage besides line-of-sight coverage.

The frame construction means 26 within the pre-transmitter system 12 discussed above uses a multiple time-separate multiplexing technique or time domain multiple access (TDMA) for combining multiple streams of the same or substantially the same digital data to be transmitted as a single data stream, where each of the multiple streams of digital data are separated from each other by a predetermined time period. The multiple streams of digital data are combined such that frames of data in the data stream include a piece of information that is currently usable, and a piece of information that will be usable in the future. However, time multiplexing is one of many techniques that can be used for transmitting a stream of digital data at one time and the same stream of digital data delayed in time, within the scope of the present invention. Any technique in which multiple time-separated versions of the same source signal can be simultaneously transmitted and independently separated by a receiver is suitable for use with a blocking mitigation technique according to the present invention.

The "present" samples referred to above are the samples that the receivers use when no blockage of the transmitted signal occurs. The "future" and "soon" samples are those samples that are stored in the receivers for some period of time to be later used if the transmitted signal is blocked and the "present" samples are not available. Thus, in one embodiment, it is desirable that the "present" samples be of the best quality desirable or applicable for the particular application. Known compression algorithms compress the 44 ksps PCM signal to provide a compressed digital data signal having a particular bit rate per second. Typical known compression algorithms incorporate frequency domain filtering, and may use fast fourier transform (FFT) processing. One known compression algorithm is referred to as psycho-acoustic coding (PAC), and is a type of audio compression algorithm which preserves only those sounds important to the human ear-brain connection. The original audio waveform itself is not preserved and replicated, rather, key mathematical features of the waveform, such as frequency bin activity, comprise the compressed data bit stream. organizations such as Dolby, MPEG, AT&T, Musicam and others have various versions of PAC algorithms, implemented in either software or hardware. Each compression algorithm has a compression factor that is the ratio of the digital data rate going in to the algorithm versus the digital data rate coming out of the algorithm.

In this discussion, the best quality is CD quality, having a compressed data rate of 128 kbps. At this rate, each frame represents about $\frac{1}{30}$ of a second of audio. However, as suggested above, in order to conserve system resources and reduce costs, it is desirable to transmit the "future" and/or "soon" samples at a lesser data quality than the "present" samples. Depending on the length of the blockage and the sophistication of the listener, the lesser quality samples may be unnoticeable. Thus, it may be desirable in many applications to send the "future" and "soon" samples at lesser data rate, for example, 32 kbps. Also, it may be desirable to transmit the "future" and "soon" samples in a monophonic format to further save system resources. Accordingly, whatever technique is used to transmit the multiple time-separated versions of the same source signal can also transmit the time-separated versions in a way that the delayed versions in the receiver are of a lesser data quality than the main transmission.

In addition to providing legs of varying quality, the various samples or legs can be filtered or separated such that two or more versions include some mutual information and some complimentary information so that when the versions are combined a complete signal is provided. In other words, by transmitting one of the samples or versions to include some of the information of a complete signal, and other samples or versions transmitting other complimentary information, as well as mutual information, the combination of the samples can provide a complete signal having a predetermined level of quality of the source signal.

Figure 16:
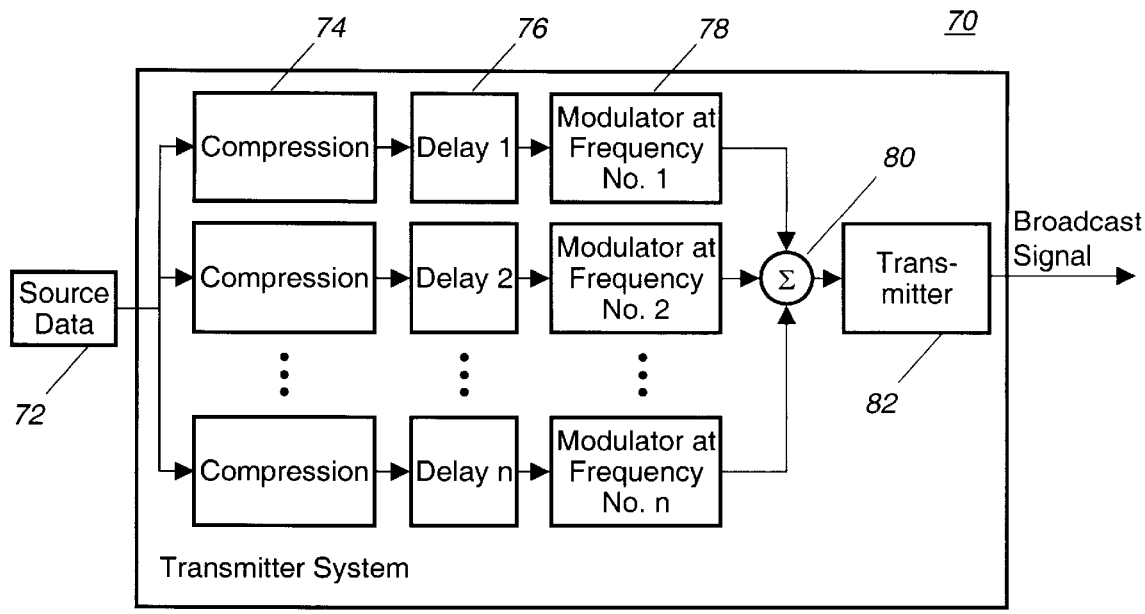
FIG. 16 is a block diagram of a transmitter system illustrating an example of broadcasting multiple time separated transmissions using frequency domain multiplexing, according to an embodiment of the present invention.

Multiple versions of the same signal separated in time may be transmitted at the same time, but at different frequencies. FIG. 16 shows a block diagram of a transmitter system 70 for transmitting multiple transmissions using frequency domain multiple access (FDMA) or frequency domain multiplexing. A digital data source signal from a data source 72 is applied to several data paths, designated paths 1–n. Any number n paths suitable for the number of delayed transmissions desired for a given system can be used. Each data path includes a compression system 74 for compressing the digital data in order to conserve system resources by any suitable compression technique known in the art. The compressed digital data in each path is then applied to a delay system 76 that delays the compressed digital data a predetermined time relative to each of the other paths. Each delay system 76 would have a different delay than the other delay systems 76, and one of the paths will have a delay of zero. The individual delay systems 76 depicted here show delays of zero seconds, five seconds, ten seconds and fifteen seconds. In a practical environment, the delays would not be symmetric in this nature. Depending on the particular environment that the system 70 is being used in, delays of zero seconds, seven seconds, twenty-five seconds in three minutes may be applicable. The delayed and compressed digital data is then applied to a modulator 78 that modulates the digital data onto a carrier frequency suitable for transmission. Each modulator would modulate the digital data at different carrier frequencies so that they are distinguishable by the different frequencies. The delayed digital data signals modulated onto the different carrier waves are then combined by a summation device 80 into a single composite broadcast signal to be transmitted by a suitable transmitter 82 to the satellite or satellites for rebroadcast to the desirable viewing area.

The receiver (not shown) would include circuitry to separate the various frequencies from the broadcast signal, demodulate the various carrier frequencies to extract the compressed digital data, decompress the data, and delay circuitry to align the separate signal paths. Thus, one or more delayed transmissions of the broadcast signal are available in the receiver to be used in the event that the broadcast signal is blocked in a manner as discussed above. It is noted that in order to conserve system resources, the delayed transmissions can be of a lesser quality than the "present" signal, as discussed above. Thus, by delaying the digital data stream any number of time, and modulating the digital data onto a carrier wave, the same composite broadcast signal can be transmitted as separate delayed signals.

Figure 17:
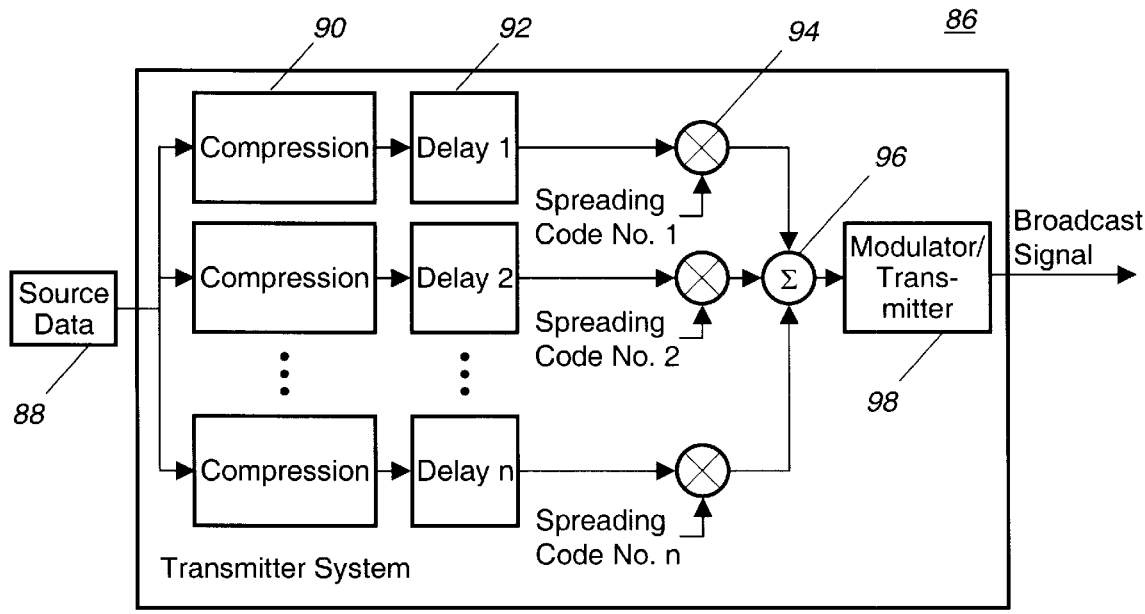
FIG. 17 is a block diagram of a transmitter system illustrating an example of broadcasting multiple time separated transmissions using a code division multiplexing scheme, according to an embodiment of the present invention.

In another example, code division multiple access (CDMA) or a code division multiplexing scheme may be employed whereby the different versions of the source signal separated in time are processed by a unique spreading code. FIG. 17 shows a block diagram of a transmitter system 86 using a code division multiplexing technique where digital source data from a data source 88 is applied to a plurality of separate paths 1–n. Once again, the digital data in each path is compressed by a compression system 90 and delayed by a delay system 92. The compressed and delayed digital data signals are then applied to a multiplier 94 in each path that multiplies the digital data with a unique spreading code. The spreading code identifies each of the separate paths to be later deciphered in the receiver. Each of the identified digital data signals are then applied to a summation device 96 and the summed signal is applied to a modulation/transmitter 98 to be transmitted to the satellite on a carrier wave. A single modulator is all that's required in the transmitter system 86 because the separate paths are not distinguished by their carrier frequencies, but by the unique spreading code.

Figure 18:
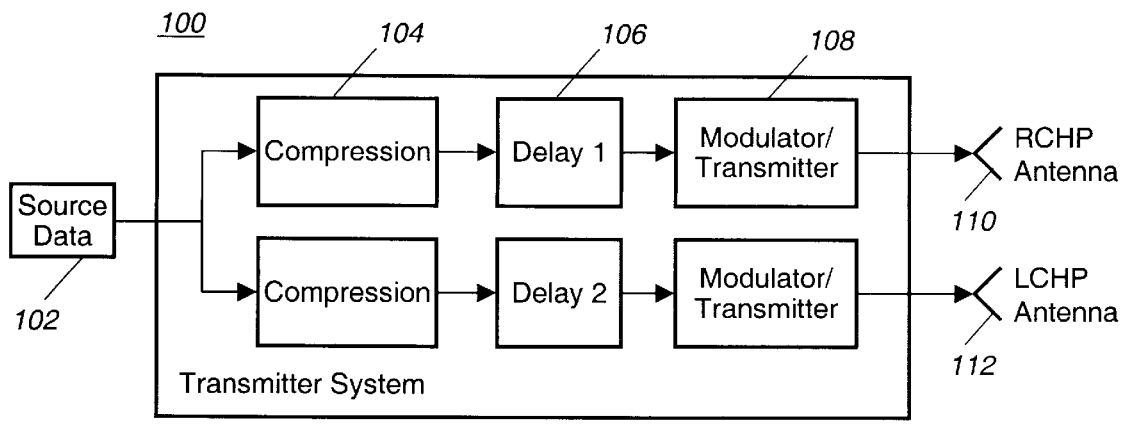
FIG. 18 is a block diagram of a transmitter system illustrating an example of broadcasting multiple time separated transmissions using different electromagnetic polarizations, according to an embodiment of the present invention.

In another example, the different versions of the digital data signal can be transmitted with different electromagnetic polarizations. FIG. 18 shows a block diagram of a transmitter system 100 where digital source data from a data source 102 is applied to multiple paths. Once again, the data in each path is compressed by a compression system 104 and then delayed by a delay system 106. The compressed and delayed digital data is then modulated onto a carrier wave and transmitted by a modulator/transmitter system 108. A first transmission path includes an antenna 110 that broadcasts the modulated digital data having one polarization, for example, right hand circular polarization, and a second transmission path broadcasts the digital data by an antenna 112 to have another polarization orthogonal to the first polarization, for example, a left hand circular polarization. Receiver circuitry would separate the two transmissions based on these polarizations.

The system described above includes a receiver that simply selects between the multiple received versions of the source signal. Instead of this simple selection, the receiver may also be designed to perform a weighted combining of the multiple received signals. By doing this, the signal-to-noise a ratio can be increased and signal integrity will improve. One simple technique would be to align the multiple received signals in time and then add them using an adaptive algorithm that applies the correct phase matching prior to the addition. The resulting signal could then be processed by a detection algorithm.

Figure 19:
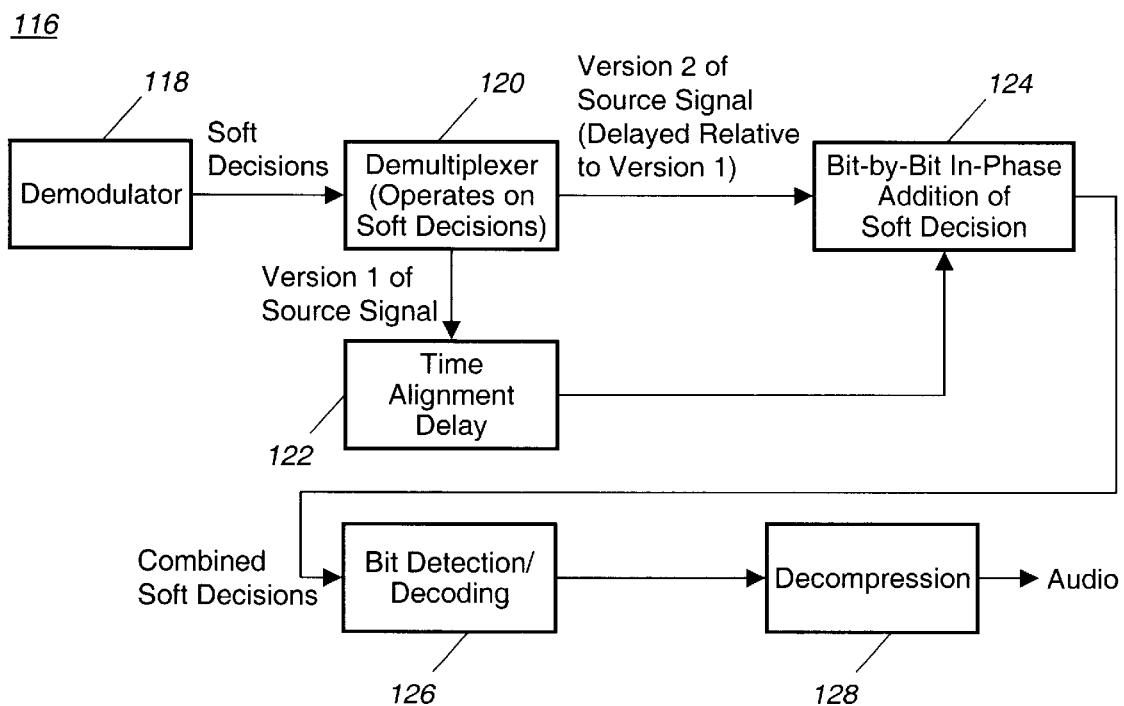
FIG. 19 is a block diagram of a receiver that combines multiple received versions of a source signal to increase signal-to-noise, according to an embodiment of the present invention.

FIG. 19 shows a block diagram of a receiver 116 that performs such a weighted combining of the multiple received signals. The received broadcast signal is applied to a demodulator 118 that strips away the carrier wave to separate the digital data information. The digital data information is applied to a demultiplexer 120 that separates the present signal and the delayed signal. The non-delayed signal is applied to a time alignment delay system 122 in order to time align it with the delayed version. Both digital data signals are then applied to an addition system 124 to combine the two signals using an adaptive algorithm that corrects the phase matching prior to the addition. The combined signal from the addition system 124 is applied to a bit detection/decoding system 126 to decode the bits, and then to a decompression system 128 to decompress the data to put it into its original format.

Other system features may further increase the performance characteristics of the blockage mitigation technique described above. For example, data interleaving may be used in conjunction with the multiple transmission concept to provide additional immunity to time dependent blockages. As is well understood in the art, data interleaving is a technique by which consecutive digital data bits are mixed up or separated so that groups of bit errors from various occurrences, such as interference or short duration blockage, are separated, and are more easily deciphered and detected in the receiver. In fact, more sophisticated systems may perform interleaving on some transmitted versions of a source signal and not on others to support fast acquisition and retuning.

Figure 20:
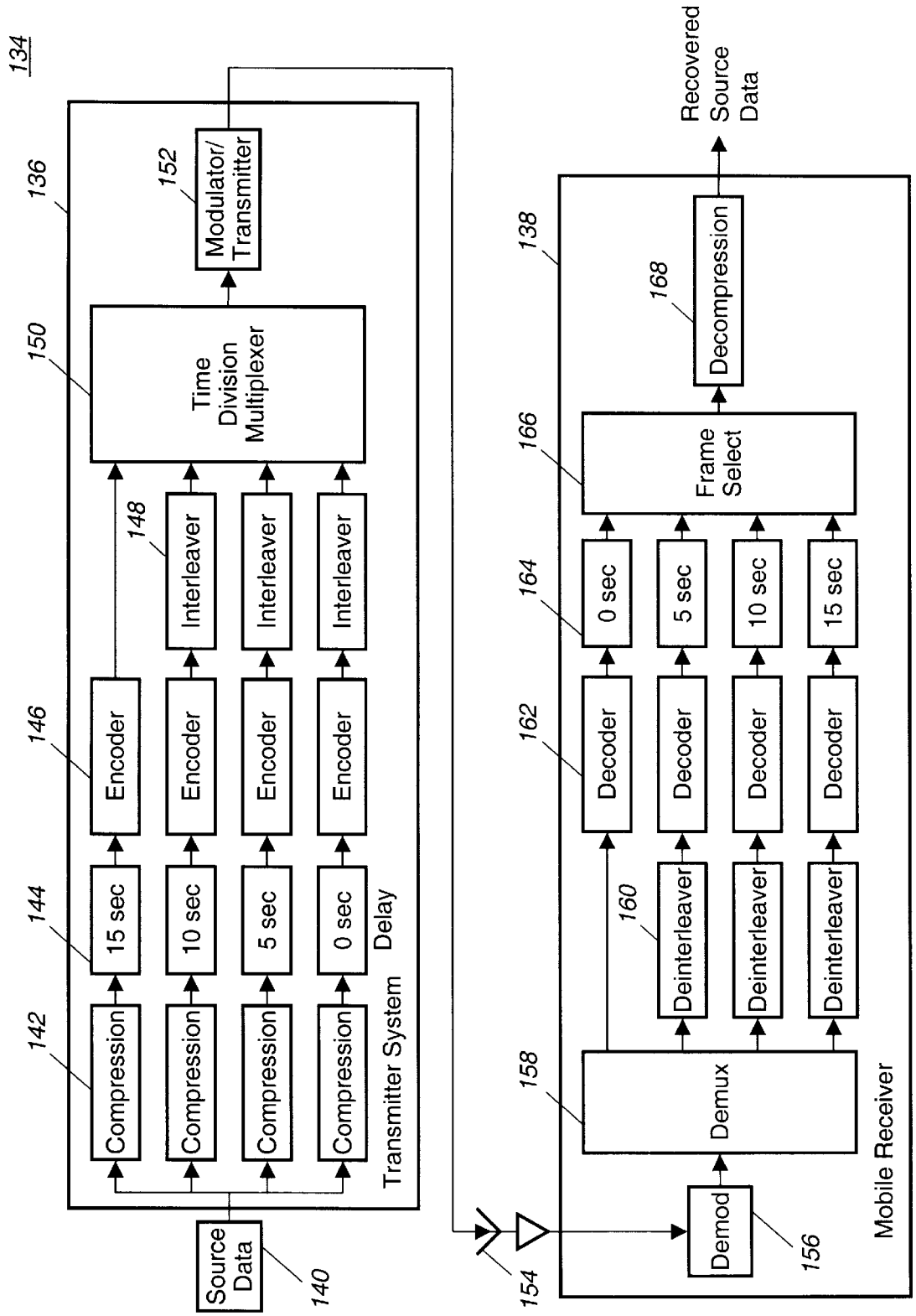
FIG. 20 is a block diagram of a transmitter and receiver system broadcasting multiple time separated transmissions and incorporating interleaving, according to an embodiment of the present invention.

FIG. 20 is a block diagram that shows a transmitter and receiver system 134 including a transmitter system 136 and a receiver system 138. A stream of digital data from a data source 140 is applied to multiple paths in the transmitter system 136, where each path compresses the digital data by a compression system 142, and delays the compressed data a predetermined time by a delay system 144. The compressed and delayed digital data stream is then applied to an encoder 146 for encoding the digital data. Three of the paths are applied to an interleaver system 148 to separate the bits in a manner that is well understood in the art. Each path is then applied to a time division multiplexer 150, for example, of the type discussed above, to combine the digital data in each of the paths into a single stream of data. A modulator/transmitter 152 modulates the digital data onto a carrier wave to be transmitted and received by an antenna 154 associated with the receiver system 138. The receiver system 138 includes a demodulator 156 that demodulates and strips the carrier wave from the received signal to separate the digital data. The digital data is then applied to a demultiplexer 158 that separates the digital data signal back into the same paths as in the transmitter system 136. A deinterleaver 160 recombines the digital data into the sequence that they were originally in, and a decoder 162 decodes the digital data for subsequent processing. Each path is then applied to an appropriate delay system 164 so that each path is aligned in time. A frame select system 166 selects the data in the desired path to be used. The frame select system 166 can select the data in the desired path by any technique suitable for the present invention. For example, the frame select system 166 can select the data path based on one or more of the received signal-to-noise ratio (SNR), the detected bit-error rate, the amplitude level of the received signal, and known tracking loop statistics. Additionally, an output signal can be selected on a segment-by-segment basis. A decompression system 168 puts the digital data back into its original digital form.

Note that the signal in the receiver system 138 having no delay is also the signal that has no interleaving in the transmitter system 136. Consequently, it is available almost immediately for the decoding and decompression algorithms. This signal supports fast acquisition, while the additional signals that have interleaving will be more immune to burst errors in the channel.

Figure 21:
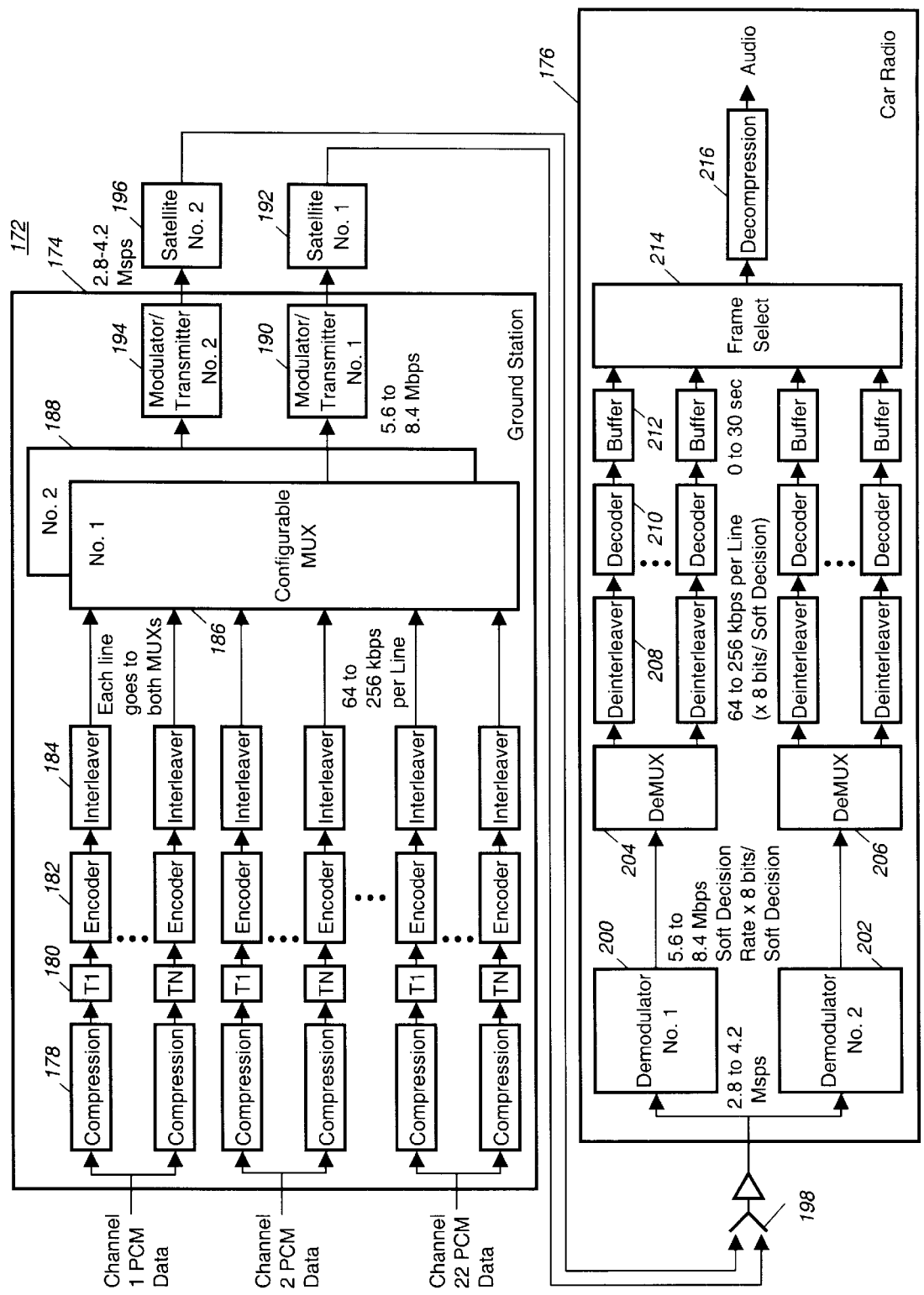
FIG. 21 is a block diagram of a transmitter and receiver system illustrating an example of a multichannel system, according to an embodiment of the present invention.
Figure 22:
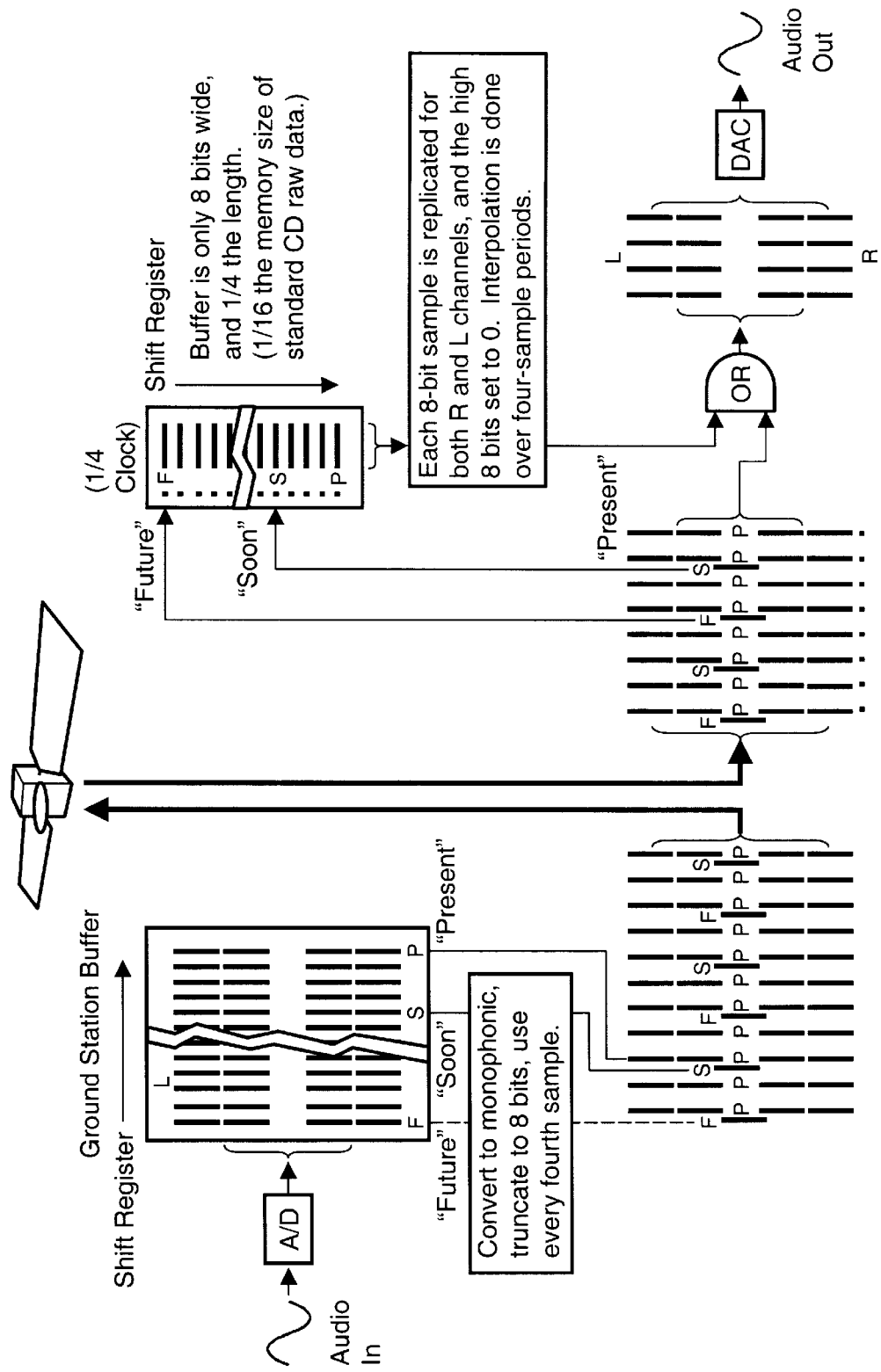
FIG. 22 illustrates another embodiment of a communication system according to the present invention.
Figure 23:
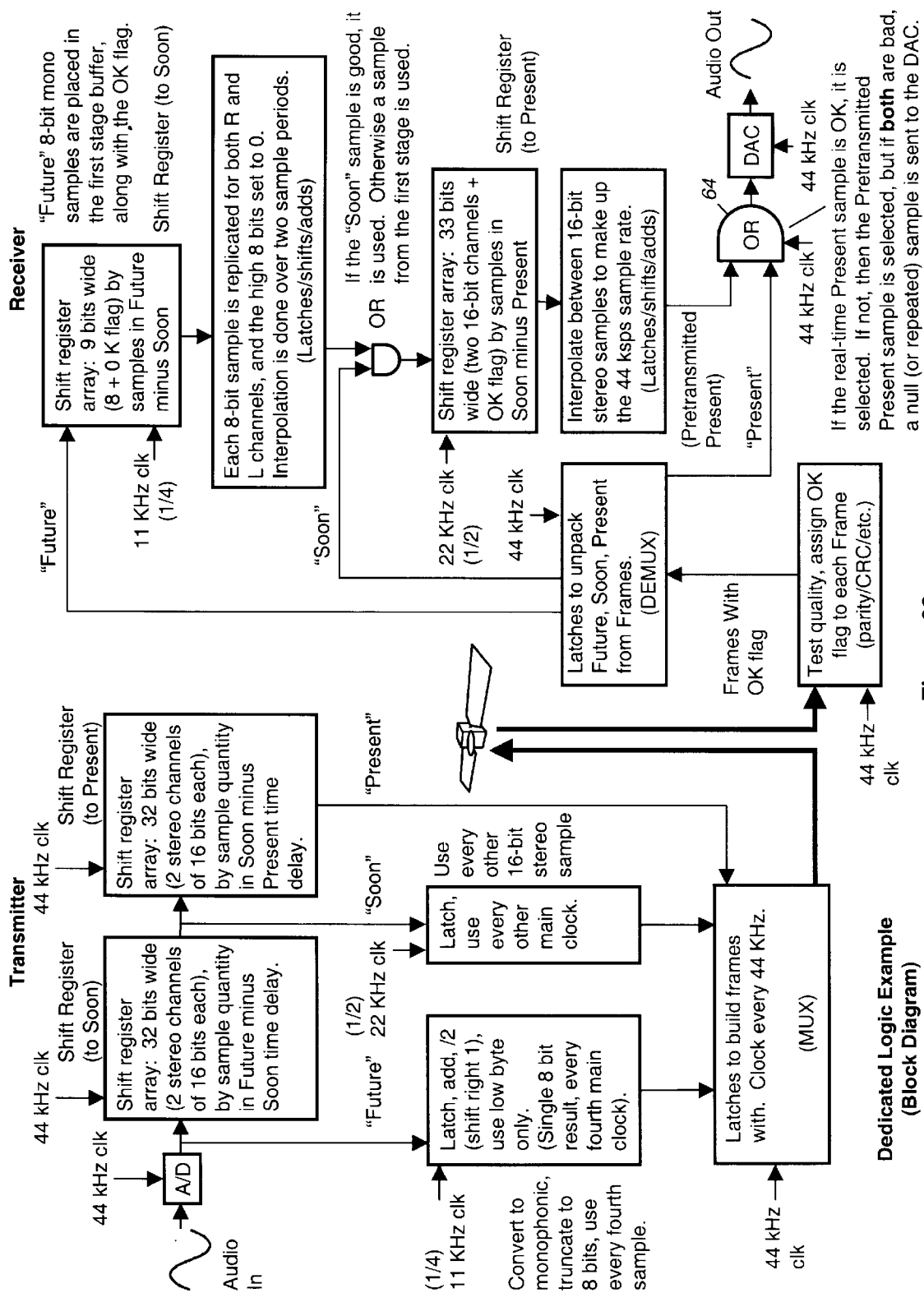
FIG. 23 illustrates an example dedicated logic implementation of the present invention.

Although the system above has been described as only transmitting a single program, the blockage mitigation techniques of the invention are also applicable for multiple source signals that are simultaneously transmitted to the user using any channelization technique, such as TDMA, FDMA, CDMA, polarization multiplexing, or any combination of these techniques. FIG. 21 shows an example of a multichannel system 172 using a TDMA technique. This example is shown for a two-satellite system providing digital audio or radio services to mobile users. The system 172 includes a ground station 174 and a mobile receiver 176. The ground station 174 receives PCM data on a plurality of program channels. Each program channel is separated into a suitable number of paths where each path is time delayed as discussed above. Each path of each channel includes a compression system 178 for compressing the digital data, a time delay system 180 for delaying the compressed data a suitable period of time, an encoder 182 for encoding the digital data, and an interleaver 184 for interleaving the coded digital data. Each path of each channel is then applied to both a first multiplexer 186 and a second multiplexer 188. The multiplexers 186 and 188 determine the composite time ordering of the digital data from all of the delay paths of all of the source signals. The composite output signal from the multiplexer 186 is applied to a modulator/transmitter system 190 to be transmitted to a first satellite 192, and the selected output of the multiplexer 188 is applied to a modular/transmitter 194 to be transmitted to a second satellite 196. The modulator/transmitter 190 operates at a different frequency than the modulator/transmitter 194.

The transmitted signals from the satellites 192 and 196 are received by an antenna 198 and are applied to the mobile receiver 176. Within the receiver 176, the signals are simultaneously applied to a first demodulator 200 and a second demodulator 202 which strip off the separate corner frequencies. The separate demodulated signals are then applied to a first demultiplexer 204 and a second demultiplexer 206 to further separate the signals into the various delay paths that were established in the ground station 174 for a selected source signal. Each data path is applied to a deinterleaver 208 for deinterleaving the data, a decoder 210 for decoding the digital data, a time buffer 212 to align each of the paths of each of the channels in time, and then to a frame select 214 to select one of the particular paths of each channel. The selected path is then applied to a decompression system 216 to put the digital data stream back in its original format. The mobile receiver 176 is capable of receiving and processing only one of the channels at a time. More sophisticated receivers may duplicate the processing shown for the single channels so that additional channels may be available for fast retuning.

The present invention also contemplates: (1) Terrestrial radio transmissions not utilizing satellite systems which also suffer from blockage scenarios; (2) Transmission systems such as optical links which do not utilize RF including transmission of all types of digitized electromagnetic signals; (3) Satellite-to-mobile-user data systems which include the PCS (Personal Communicator Satellite) systems for beepers, facsimile, Internet, "telegrams," electronic mail, etc. Such systems include systems for communication of traffic, weather or other graphically-oriented information that is continuous but may encounter dynamic blockages. Examples include systems for a dashboard display of position, traffic, and weather; and (4) Video (TV) direct broadcast systems, including any mobile and stationary receipt of TV signals when reception is intermittently obscured. Existing TV satellite receiver systems function as long as the dish has a clear view of the satellite, but fail temporarily in the presence of heavy rainfall (cloudburst). The present invention can be utilized to alleviate such problems by, for example, utilizing a disk storage (e.g., hard disk) for storing Future (or Soon) video in a home satellite TV receiver.

The present invention, advantageously, eliminates a severe disadvantage of existing direct satellite broadcasting to mobile radio systems. It provides conventional radio performance for satellite radios without frequent annoying losses of audio. The system can also be utilized in various industries such as commercial trucking and military applications.

EXAMPLE I

An example embodiment of a set of pseudo-code instructions for the pre-transmitter 12 and post-receiver 28 of the present invention is described below.

Pre-transmitter Data Operations (ground station)

The following pseudo-code occurs (loops) at every clock cycle, here assumed as 44, 100 Hz, the same as the standard CD music format PCM sampling rate. It is assumed that a programmable hardware clock (a chip having a down-counter and oscillator time base reference), is set up to send an interrupt which the software program can detect, and that a new stereo, 16 bit audio sample will be available from the music feed at each clock cycle. A different system-clock/synchronization scheme and packing additional data into the stream besides a single audio sources are also possible.

The "Transmitter" referred to in the description below is depicted in FIG. 16, where audio is converted from analog-to-digital and prepared for uplink to the satellite.

```
Initialization:
   STEP T-00     Flush the buffer memory by filling it with
                 null sample values (all 0s).
                 Initialize the Frame Type counter to 0.
                 (This is a count of the relative Frame
                 number in a 0, 1, 2, 3 sequence.)
                 Initialize registers and pointers to be used
                 in the main program.
                 Set up a programmable hardware-clock to
                 provide an interrupt at a rate of 44.100 Hz.
   Main loop:
```

Frames of data are packed for transmission via the uplink every 1/44,100th of a second. A "Frame" in this example can have one of three sizes, depending on the content at a particular time. In FIG. 16, the outgoing data stream always has a single "Present" stereo sample of 4 bytes ("P"). Every other Frame also includes a "Soon" stereo sample of 4 bytes ("S") (8 bytes total). Every fourth Frame includes a "Present" (P) and a "Soon" (S) sample, plus a "Future" ("F") single byte sample (9 bytes total). The Frames can also include a header, identifying size and type, data error detection bits, and other ancillary information.

| | |
|---|---|
| STEP T-01 | Wait (loop) until a timing interrupt occurs (detect the leading edge of the pulse). Get a Present sample from the exit of the buffer memory (read the sample value). Insert it in any Frame. (A Frame always contains a Present sample.) (The same clock could be used to trigger the A/D device to convert, if needed.) - |
| STEP T-02 | Is this an ODD Frame? (Is this the Frame Type count 1 or 3?) If not, skip to STEP T-04, since this is not a Soon or a Future Frame type. Get (read) a Soon sample from the tap (delayed position/address) in the buffer. Insert it in the frame. |
| STEP T-03 | Is this the Fourth Frame? (Is the Frame Type count equal to 3?) If not, skip to STEP T-04, since this is not a Future Frame type. Get (read) a Future sample from the start of the buffer. Convert the stereo sample to monophonic (e.g., add the two 16 bit right and left audio channel samples together, then divide by two to get a single bit monophonic sample.) Truncate the 16 bit monophonic (e.g., add the two 16 bit right and left audio channel samples together, then divide by two to get a single 16 bit monophonic sample). Truncate the 16 bit monophonic sample to 8 bits (e.g., discard the high-order byte). Insert the 8 bit, monophonic Future sample into the Frame. |
| STEP T-04 | Add the appropriate header information to the Frame (e.g., the Frame Type) Alert the uplink that a Frame is ready for transmittal (e.g., set a data ready flag). (The Frame data could be read by the uplink circuitry by a number of means such as examining designated ports to the CPU). (The uplink circuitry leads the Frame header to get its size, then reads the correct amount of data for the Frame and transmits it, and then resets the data ready flag.) Update the Frame Type counter. (Increment, and if more than 3 reset to 0). Update the buffer pointers to Future, Soon, and Present. (Decrement, and reset if rollover, a standard "ring buffer" technique.) (This is the equivalent of "shifting" the buffer, were it implemented in a hardware shift register.) Get a new 16 bit stereo sample from the audio feed, and insert it at the "Future" pointer position in the buffer. Loop back up to STEP T-01 to build the next Frame to transmit. |

The above process continues indefinitely, continually building Frames and transmitting them to the satellite via uplink.

Post-receiver Data Operations Description (e.g., car radio)

The receiver (car radio) can have its own time base (clock), similar to the clock described in the Transmitter Data Operations Description described above. (Synchronization of the clocks would be via any of several well known means.) The following pseudo-code occurs (loops) at every receiver clock cycle, here assumed as 44,100 Hz, the same as the standard CD music format PCM sampling rate and the same as the Transmission sample clock. A hardware clock (a chip having a down-counter and oscillator time base reference), sends an interrupt which the software program can detect, and a new stereo, 16 bit PCM audio sample is then fed to the output DAC for the production of analog audio for subsequent amplification.

The "Receiver" referred to here is depicted in FIG. 16 where digital data is received from the satellite and converted to an analog audio signal.

| | |
|---|---|
| Initialization: | |
| STEP R-00 | Flush all stages of the buffer memory including the "OK flag" bits filling with null samples values (all 0s). Initialize registers and pointers to be used by the main program. Initialize the buffer clock count to 0 (of 0–3 possible). |
| Main loop: | |
| | Unpack Frames of data received via the downlink once every 1/44, 100th of a second. A "Frame" in this example can have one of three sizes, as described in the Transmit discussion. |
| STEP R-01 | Wait (loop) until a timing interrupt occurs (detect the leading edge of the pulse). Get (read into temporary storage) a Frame of data from the incoming downlinked data stream. Determine from the Frame header the Frame Type and size. (Which types of data does this Frame contain: Present, Soon, Future bytes?) (The system clocks should be synchronized such that the Frame Types correspond to the buffer clock count.) Determine from the Frame header error detection information whether all data in the Frame has been correctly received, and set the "OK flag" bit accordingly (e.g., is the Frame checksum correct?) |
| | [The "OR" switch function is implemented for the incoming Present sample, and the delayed Future and Soon samples if needed.] If the OK Flag for the incoming Frame is OK, then select the Present sample from the incoming Frame via the "OR" switch, interpolate between odd/even samples if needed, and skip to STEP R-02. Create a null sample, and fall through to STEP R-02. (Neither the Present sample or the delayed Future/Soon samples were valid, a blockage leaked through.) |
| STEP R-02 | Send the sample to the DAC and clock it out. (This is a basic PCM audio output cycle.) If the buffer clock count is NOT 1 or 3, skip to STEP R-04. [This is an odd clock cycle: the buffer second stage needs updating.] Shift the buffer stage 2 one element by moving its pointers (or shifting it if a true shift register is used). If the OK Flag of the incoming "Soon" sample is OK, then insert the new Soon sample at the input of buffer stage 2, and skip to STEP R-03. [The Soon sample was bad. Create a sample to input to buffer stage 2 from buffer stage 1.] If the output sample of buffer stage 1 is not valid (bad OK Flag), then set the OK Flag of the buffer stage 2 input sample to 0 (bad), and skip to STEP R-03. Get a sample from the output of buffer stage 1 (8 bit monophonic, a single byte). Use the same data for both Right and Left channels, interpolate between samples if needed, and insert at the buffer stage 2 input. |

-continued

```
[Update buffer stage 1 if this is a clock count of 3.]
STEP R-03    If the buffer clock count is NOT 3, skip to
             STEP R-04.
             Shift the buffer stage 1 one element by
             moving its pointers (or shifting it if a
             true shift register is used).
             If the incoming "Future" sample is good (OK
             Flag is OK), then insert the new Future
             sample at the input of buffer stage 1 and
             skip to STEP R-04.
             Set the OK Flag to 0 (bad) of the input to
             buffer stage 1.
STEP R-04    Update the buffer clock counter.
             (Increment, and if more than 3 reset to 0).
             Loop back up to STEP R-01 to build the next
             Frame to transmit.
```

The above process continues indefinitely, continually unpacking Frames received, sending PCM data to the DAC, and updating the buffer stages with new data.

EXAMPLE II

Referring to FIG. 17 block diagrams of an example embodiment of dedicated logic systems for the pre-transmitter and post-receiver systems of the present invention are shown and described.

The present invention has been described in considerable detail with references to certain preferred versions thereof; however, other versions are possible. For example, depending on the specific performance goals of a given system, any combination of more temporal taps, reduced data rates to conserve bit rate resources, and use of more than one satellite is contemplated by the present invention. Therefore, the spirit and scope of the appended claims should not be limited to the description of the preferred versions contained herein.

What is claimed is:

1. A method of broadcasting a source signal to a mobile user environment, said method comprising the steps of:
    creating two or more versions of the source signal where the two or more versions include information at different levels of quality so that one version of the source signal is of a higher quality than another version of the source signal;
    separating the multiple versions of the source signal in time so that multiple versions of the source signal are delayed relative to each other;
    combining the multiple versions of the source signal as a composite transmitted signal;
    transmitting the composite signal; and
    receiving the composite transmitted signal in a mobile receiver, separating the multiple versions of the source signal in the receiver, and using one more of the multiple versions to provide a continuous output signal at a desired level of quality.

2. The method according to claim 1 wherein the step of separating the multiple versions separated in time includes delaying the version of the source signal with the highest quality by the most time.

3. The method according to claim 1 further comprising the step of identifying the separated multiple versions of the source signal by using a time division multiplexing technique.

4. The method according to claim 1 further comprising the step of identifying the separated multiple versions of the source signal by using a frequency domain multiplexing technique.

5. The method according to claim 1 further comprising the step of identifying the separated multiple versions of the source signal by using a code division multiplexing scheme.

6. The method according to claim 1 further comprising the step of identifying the separated multiple versions of the source signal by using different electromagnetic polarizations.

7. The method according to claim 1 wherein the step of receiving the composite signal includes using an adaptive algorithm to increase signal quality.

8. The method according to claim 1 further comprising the step of interleaving one or more of the multiple versions of the source signal prior to transmitting the composite signal.

9. The method according to claim 1 wherein the source signal includes content selected from the group consisting of audio, voice and video.

10. The method according to claim 1 further comprising the step of compressing the source signal using a compression algorithm.

11. The method according to claim 10 wherein the step of creating multiple versions of the source signal includes varying a compression ratio of the compression algorithm.

12. The method according to claim 1 further including the steps of transmitting a plurality of different source signals, wherein the step of creating multiple versions of the source signal includes creating multiple versions of each of the source signals and separating each of the multiple versions in time.

13. The method according to claim 1 wherein the step of creating multiple versions of the source signal includes creating a present, future and soon versions of the source signal where the present signal is delayed the most, the future signal is delayed the least and the soon signal is delayed an intermediate time.

14. A method for providing high performance/high capacity broadcast communications of a source signal in a mobile user environment where the nature of the source signal is such that it can lose precision and still be usable, said method comprising the steps of:
    a) creating two or more versions of the source signal where multiple versions of the source signal are not all at the same level of quality;
    b) delaying the multiple versions of the source signal in time relative to each other prior to transmission of the versions of the source signal so as to substantially decorrelate fading effects experienced by transmission of each of the versions of the source signal to a mobile receiver based on statistics of the propagation within the mobile environment; and
    c) receiving the multiple time-separated versions of the source signal in the receiver and using a continuous output signal that is substantially the same in content as the source signal.

15. The method of claim 14 where the content of the source signal is audio, voice or video.

16. The method of claim 14 where the source signal is processed by an information compression algorithm.

17. The method of claim 14 where the different quality versions of the source signal are produced by varying a compression factor of a compression algorithm.

18. The method of claim 14 where the multiple versions are transmitted to the mobile receiver using time division multiplexing.

19. The method of claim 14 where the multiple versions are transmitted to the mobile receiver using independent frequencies.

20. The method of claim 14 where the multiple versions are transmitted to the mobile receiver using code division multiplexing.

21. The method of claim 14 where the multiple versions are transmitted to the mobile receiver using independent polarizations.

22. The method of claim 14 where the multiple versions are processed by an error correction encoder prior to transmission for additional protection against the mobile environment.

23. The method of claim 14 where the multiple versions are processed by a time interleaver prior to transmission for additional protection against the mobile environment.

24. The method of claim 14 where at least one of the multiple versions of the source signal that is one of the last versions to arrive at the mobile receiver is transmitted without interleaving to support fast acquisition and re-tuning.

25. The method of claim 14 where the mobile receiver aligns the multiple received signals in time and produces an output signal by weighted combining of the multiple received signals.

26. The method of claim 14 where the mobile receiver aligns the multiple received signals in time and produces an output signal by selection of one of the multiple received signals on a segment-by-segment basis.

27. The method of claim 26 where segments correspond to one or more frames of a voice, audio, or video compression algorithm.

28. The method of claim 26 where selection is based on one or more of received SNR, detected bit-error rate, received signal level, and tracking loop statistics.

29. The method of claim 14 where different source signals are simultaneously transmitted using one or more of TDMA, FDMA, CDMA, polarization multiplexing, or any combination of these techniques.

30. The method of claim 29 where the mobile receiver is capable of storing received information from one or more of the source signals that are not currently being processed for user output to support fast re-tuning.

31. The method of claim 14 where one or more satellites transmit the multiple time-separated signals directly to the mobile receivers.

32. A method for providing high performance/high capacity broadcast communications of a source signal in a mobile user environment where the nature of the source signal is such that it can lose precision and still be usable, said method comprising the steps of:
   a) creating two or more versions of the source signal where multiple versions of the source signal contain some mutual information and some complementary information such that each version represents the source signal at some level of quality and a combination of the multiple versions can be performed to represent the source signal at a higher level of quality;
   b) delaying the multiple versions of the source signal in time relative to each other prior to transmission of the versions of the source signal so as to substantially decorrelate the fading effects experienced by transmission of each of the versions of the source signal to a mobile receiver based on a statistics of the propagation of the mobile environment; and
   c) receiving the multiple time-separated versions of the source signal in the receiver and using a continuous output signal that is substantially the same in content as the source signal.

33. The method of claim 32 where the content of the source signal is audio, voice, or video.

34. The method of claim 32 where the source signal is processed by an information compression algorithm.

35. The method of claim 32 where the multiple versions are transmitted to the mobile receivers using time division multiplexing.

36. The method of claim 32 where the multiple versions are transmitted to the mobile receivers using independent frequencies.

37. The method of claim 32 where the multiple versions are transmitted to the mobile receivers using code division multiplexing.

38. The method of claim 32 where the multiple versions are transmitted to the mobile receivers using independent polarizations.

39. The method of claim 32 where the multiple versions are processed by an error correction encoder prior to transmission for additional protection against the mobile environment.

40. The method of claim 32 where the multiple versions are processed by a time interleaver prior to transmission for additional protection against the mobile environment.

41. The method of claim 32 where at least one of the multiple versions of the source signal that is one of the last versions to arrive at the mobile receiver is transmitted without interleaving to support fast acquisition and re-tuning.

42. The method of claim 32 where the mobile receiver aligns the multiple received signals in time and produces an output signal by selective combining of the multiple received signals on a segment-by-segment basis.

43. The method of claim 32 where segments correspond to one or more frames of a voice, audio, or video compression algorithm.

44. The method of claim 32 where the selective combining of the multiple signals is weighted by the SNR, detected bit-error-rate, received signal level, or tracking loop statistics for each received signal.

45. The method of claim 32 where different source signals are simultaneously transmitted using one or more of TDMA, FDMA, CDMA, polarization multiplexing, or any combination of these techniques.

46. The method of claim 45 where the mobile receiver is capable of storing received information from one or more of the source signals that are not currently being processed for user output to support fast re-tuning.

47. The method of claim 32 where one or more satellites transmit the multiple time-separated signals directly to the mobile receivers.

48. A system for transmitting a source signal to a mobile receiver, said system comprising:
   a digital data processing circuit, said processing circuit creating multiple versions of the source signal and separating the multiple versions in time, wherein at least two of the versions of the source signal include different levels of quality;
   a transmitter circuit, said transmitter circuit transmitting the multiple versions of the source signal so that the transmitted multiple versions are separated in time from each other; and
   a receiver, said receiver being responsive to each of the transmitted multiple versions of the source signal, said receiver delaying the multiple versions of the source signal so that each version is aligned in time, said receiver further selecting one of the multiple versions of the source signal to be converted to an analog signal to be used by a user.

49. The system according to claim 48 wherein the digital data processing circuit delays the version of the source signal with the highest quality by the most time.

50. The system according to claim 48 wherein the digital data processing circuit creates a present, future and soon version of the source signal wherein the present signal is delayed the most, the future signal is delayed the least, and the soon signal is delayed an intermediate time.

51. A system according to claim 48 wherein the digital data processing circuit includes a time division multiplexing circuit, said time division multiplexing circuit identifying the separated multiple versions of the source signal.

52. The system according to claim 48 wherein the digital data processing circuit includes a frequency domain multiplexing circuit, said frequency domain multiplexing circuit separately multiplexing each of the multiple versions of the source signal onto a separate carrier wave.

53. The system according to claim 48 wherein the digital data processing circuit includes a code division multiplexing circuit, said code division multiplexing circuit multiplexing a separate code onto each of the multiple versions of the source signal to identify the multiple versions.

54. The system according to claim 48 wherein the digital data processing circuit includes means for polarizing the multiple versions of the source signal using different electromagnetic polarizations.

55. The system according to claim 48 wherein the digital data processing circuit includes interleaving means for interleaving one or more of the multiple versions of the source signal.

56. The system according to claim 48 wherein the source signal includes contents selected from the group consisting of audio, voice and video.

57. The system according to claim 48 wherein the digital data processing circuit uses a compression algorithm to compress the digital data.

58. The system according to claim 57 wherein the digital data processing circuit varies a compression ratio of the compression algorithm.

* * * * *